(12) United States Patent
Yamashita

(10) Patent No.: US 6,973,911 B2
(45) Date of Patent: Dec. 13, 2005

(54) METHOD AND DEVICE FOR CONTROLLING IGNITION TIMING OF IGNITION DEVICE FOR INTERNAL COMBUSTION ENGINE

(75) Inventor: Ryohei Yamashita, Tokyo (JP)

(73) Assignee: Iida Denki Kogyo Co., Ltd., Mitaka (JP)

( * ) Notice: Subject to any disclaimer, the term of this patent is extended or adjusted under 35 U.S.C. 154(b) by 1 day.

(21) Appl. No.: 10/489,829

(22) PCT Filed: Apr. 11, 2003

(86) PCT No.: PCT/JP03/04604

§ 371 (c)(1),
(2), (4) Date: Apr. 13, 2004

(87) PCT Pub. No.: WO03/087568

PCT Pub. Date: Oct. 23, 2003

(65) Prior Publication Data

US 2004/0255901 A1 Dec. 23, 2004

(30) Foreign Application Priority Data

| Apr. 12, 2002 | (JP) | 2002-110305 |
|---|---|---|
| Jun. 28, 2002 | (JP) | 2002-190970 |
| Sep. 15, 2002 | (JP) | 2002-259680 |
| Oct. 22, 2002 | (JP) | 2002-306785 |
| Nov. 21, 2002 | (JP) | 2002-338065 |

(51) Int. Cl.[7] ............................................. F02P 5/15
(52) U.S. Cl. .............. 123/335; 123/406.57; 123/406.53
(58) Field of Search ............................. 123/335, 406.53, 123/406.54, 406.56, 406.57, 599, 600, 605, 618; 315/208 CD

(56) References Cited

U.S. PATENT DOCUMENTS

| 4,108,131 A | * | 8/1978 | Shibukawa | ............ | 123/406.57 |
| 4,141,331 A | * | 2/1979 | Mallory, Jr. | ................ | 123/600 |
| 5,635,801 A | * | 6/1997 | Regazzi et al. | ....... | 315/209 CD |

FOREIGN PATENT DOCUMENTS

| JP | U 57-162966 | 10/1982 |
| JP | U 58-193276 | 12/1983 |
| JP | A 59-134378 | 8/1984 |
| JP | A 3-271565 | 12/1991 |
| JP | A 6-229312 | 8/1994 |
| JP | A 6-346830 | 12/1994 |
| JP | A 7-26602 | 1/1995 |
| JP | A 7-91352 | 4/1995 |
| JP | A 11-173248 | 6/1999 |
| JP | A 2000-120518 | 4/2000 |
| JP | A 2000-240543 | 9/2000 |
| JP | A 2000-240549 | 9/2000 |
| JP | A 2001-41137 | 2/2001 |

* cited by examiner

*Primary Examiner*—Willis R. Wolfe, Jr.
(74) *Attorney, Agent, or Firm*—Oliff & Berridge, PLC

(57) ABSTRACT

The invention simplifies the structure of a magneto generator and stabilizes the operation of an internal combustion engine at the time of start-up, thereby providing an ignition device simplified in structure and reduced in size and providing improved safety to the internal combustion engine. In an ignition device for a capacitive discharge internal combustion engine, an ignition timing signal is calculated with a cycle detection signal obtained at a timing at which a forward voltage portion of an output voltage from a generator coil has reached a cycle detection voltage for making continual ignition operations available, and a peak voltage detection signal and a start-up voltage detection signal are obtained in accordance with a delayed reverse voltage portion of the output voltage from the generator coil. In a preset normal region speed or less in which a load is coupled to the engine, an ignition signal is output immediately after the peak voltage detection signal has been generated. In a normal region speed or more, an ignition signal is output after the duration of the ignition timing signal from the point in time of output of the cycle detection signal. At the time of start-up, an ignition signal is output in response to the start-up voltage detection signal according to the cycle detection signal. This eliminates the need of a coil for generating a timing signal and provides a safe start-up operation.

22 Claims, 20 Drawing Sheets

METHOD AND DEVICE FOR CONTROLLING IGNITION TIMING OF IGNITION DEVICE FOR INTERNAL COMBUSTION ENGINE

BACKGROUND OF THE INVENTION

1. Field of the Invention

The present invention relates to an ignition device for an internal combustion engine, and more particularly to a method and device for controlling the ignition timing of a capacitive discharge ignition device.

2. Description of the Related Art

A strong demand exists for providing an accurately controlled ignition timing at a desired point in time to provide safe and efficient operations, reduced fuel consumption, and clean exhaust gases for an internal combustion engine. To this end, as disclosed in Japanese Published Examined Patent Application No. H-7-26602, the ignition timing is controlled using a microcomputer.

The aforementioned conventional technique is designed to provide a power supply circuit for converting an output voltage from a generator coil (exciter coil) into a direct voltage so as to employ the power supply circuit as a power supply for the microcomputer. During a low speed operation of the engine, the technique provides an ignition signal using a low-speed ignition position signal supplied by a pulser coil, and measures the ignition position, calculated in accordance with a pulser coil external interruption signal, by counting clock pulses to perform ignition operations.

This design provides advantageous functions that make it possible to operate the microcomputer without a battery and perform an ignition operation even during at a low speed operation, including the time of start-up, of an engine which cannot provide a voltage available to the operation of the microcomputer.

Some capacitive discharge ignition devices for an internal combustion engine employ a method for preventing over-rotation of an ignition device having no pulser coil for generating a signal to define an ignition timing, in which an over-rotation of RPM of an internal combustion engine causes an ignition operation of the ignition device to be stopped, i.e., to be in a misfire state (e.g., Japanese Published Unexamined Patent Application No. H-11-173248).

The technique disclosed in Japanese Published Unexamined Patent Application No. H-11-173248 detects the RPM of an internal combustion engine in accordance with the magnitude of a forward voltage portion of an output voltage from a generator coil (exciter coil) in a capacitive discharge ignition device. The technique defines, as a steady-state control mode, the detected RPM being at an operation upper limit speed or less, i.e., the upper limit of the range of operation speeds which is preset and regarded as being appropriate to operate a load, and defining the detected RPM being above the operation upper limit speed as an over-rotation prevention control mode.

In the steady-state control mode, a rechargeable capacitor is recharged each time the generator coil generates a forward voltage portion of the output voltage to perform a proper ignition in the internal combustion engine.

In the over-rotation prevention control mode, misfire control and ignition recovery control are alternately provided to recover the control mode to the steady-state control mode when the RPM detected during an ignition period is at the operation upper limit speed or less. The misfire control short-circuits the forward voltage portion from the generator coil to stop ignition operations during a preset misfire period, whereas during a preset ignition period, the ignition recovery control releases the short-circuiting of the forward voltage portion from the generator coil to recover the ignition operation provided by the ignition device and detects an RPM in accordance with the magnitude of the forward voltage portion from the generator coil.

This design provides an advantage of detecting the RPM of the internal combustion engine with stability in accordance with the forward voltage portion from the generator coil which is not affected by the armature reaction during an ignition period, thereby making it possible to provide control for maintaining the RPM at the operation upper limit speed or less. The design also provides an advantage of eliminating the need to provide a special sensor for detecting the RPM of an internal combustion engine, thereby simplifying the structure thereof.

On the other hand, some known stop means for an ignition device for an internal combustion engine connect a stop switch in parallel to a generator coil to manually turn on the stop switch, thereby short-circuiting between both terminals of the generator coil to disable the ignition operation and thus stop the operation of the internal combustion engine.

This stop means employing only the manual stop switch has a disadvantage in that although a stop switch formed of a push-button self-recovery normally open contact switch provides an easy stop operation, it requires continuously pressing the stop switch until the internal combustion engine comes to a complete stop, thus complicating its handling.

Additionally, the stop switch formed of a sliding self-hold switch provides an advantage of self-holding an ON state with stability, thus making it possible to reliably stop the internal combustion engine by switching the stop switch to the ON state. On the other hand, such a disadvantage is also provided where the internal combustion engine may be started without having switched the stop switch to an OFF state, thereby making it difficult to re-start the internal combustion engine.

In this context, a conventional technique available to solve these disadvantages provides means configured such that both ends of a generator coil are connected with a series circuit that includes a self-recovery stop switch and a rechargeable/dischargeable capacitor, and with the anode and cathode of a switching element, with the gate of the switching element being connected to a discharge circuit of the rechargeable/dischargeable capacitor (e.g., see Japanese Published Unexamined Patent Application No. 2000-240549).

However, the aforementioned prior art disclosed in Japanese Published Examined Patent Application No. H-7-26602 requires a pulser coil external to the generator coil, thereby raising a problem of the generator being made complicated in structure, and requiring high dimensional accuracy during assembly leading to complicated handling.

There was also another problem in that an ignition operation is performed even at the time of a low speed operation of an engine which cannot provide a voltage available to the operation of the microcomputer, causing the engine to operate very unstably at a low speed and especially to operate unstably at the time of a start-up.

There was still another problem in that the low-speed ignition position signal supplied by the pulser coil is always generated at constant rotational angle intervals because the pulser coil is fixed immovably, thereby making it impossible to provide an advancing operation suitable for the speed of the engine in the low speed region and thus eliminate the instability in low speed operation of the engine.

Furthermore, even when a microcomputer controls the ignition timing in the low speed region of the engine, the ignition timing is set by counting clock pulses of a temporal signal, which is set in accordance with the information on the RPM obtained, from a constant starting position of counting. Thus, there was another problem in that occurrence of variations in rotation typical of the low speed region, causing the RPM of the engine to be reduced at the time when the piston approaches the top dead center, would result in a significant advance in ignition timing, thereby leading to the possibility of a kickback occurrence.

In the aforementioned prior art according to Japanese Published Unexamined Patent Application No. H-11-173248, the over-rotation prevention control mode is made up of the misfire control and the ignition recovery control to alternately provide the misfire control and the ignition recovery control. However, since the ignition recovery control is completely the same as the ignition control in the steady-state control mode, the RPM of the internal combustion engine that has started to decrease due to the misfire control is raised again by the ignition recovery control. Thus, there was another problem in that it proves difficult to smoothly reduce the RPM of the internal combustion engine.

To eliminate the occurrence of the aforementioned drawbacks, it is also conceivable to provide the misfire control with a time width sufficient for the RPM to reliably reduce below the operation upper limit speed. However, this eliminates the need for the ignition recovery control in the over-rotation prevention control mode, providing no meaning to the aforementioned prior art. In this case, there is a problem in that the difference between the RPM in the misfire state and the RPM at the time of the ignition state being restored is likely to become bigger, thereby causing a load to be operated under significant variations in speed and lack of smoothness.

It is certain that the aforementioned prior art disclosed in Japanese Published Unexamined Patent Application No. 2000-240549 allows the internal combustion engine to be reliably stopped by a simple depression of a push-button switch or the stop switch. However, the ignition control circuit serving as a main portion of the ignition device requires proper setting of a circuit constant such as impedance, complicated handling such as setting of ratings of each of the parts constituting the stop means, and complicated connections to the ignition control circuit. This raised a problem of requiring time and effort for handling and implementation.

There was also a problem in that occurrence of a failure such as a short-circuited or open rechargeable/dischargeable capacitor or switching element leads to a loss of a stop function thus providing no fail-safe function.

Furthermore, to stop the internal combustion engine, the technique also requires, as dedicated parts in addition to the stop switch, the rechargeable/dischargeable capacitor and the switching element as well as a backflow blocking diode and resistive element. Thus, this raised a problem in that forming the stop means requires a number of parts, thereby making its structure complicated as well as raising its costs.

In the aforementioned prior art according to Japanese Published Examined Patent Application No. H-7-26602, the rising edge of a recharge voltage, at the time of start-up of the internal combustion engine, in a constant voltage power supply portion for recharging the reverse voltage portion of the generator coil is delayed due to the current limiting resistor provided for security of the input portion, thereby making it impossible to start up the microcomputer quickly. Thus, there was another problem in that since a recoil starter had to be used to rotate the internal combustion engine at least three to four times to provide ignition, its start-up characteristics were not always good.

In this context, the present invention was developed to solve the aforementioned prior art problems. It is therefore an object to technically simplify the structure of a generator and stabilize the operation of an engine at the time of start-up, thereby providing an ignition device simplified in structure and reduced in size and providing improved safety to the engine.

It is another object to technically stabilize the operation of the engine in the low speed region including at the time of start-up, thereby providing improved safety to the engine and secure ignition operations.

It is still another object with an ignition device for a capacitive discharge internal combustion engine to technically maintain the RPM of the internal combustion engine reliably with stability at the operation upper limit speed or less which is a preset upper limit of the operation speed region in which a load can be operated efficiently with stability, thereby providing improved safety to the engine and providing efficient operations to the internal combustion engine.

It is still another object to technically ensure the internal combustion engine to be safely stopped in a simple and reliable manner, thereby providing simplified handling and structure, realizing a high fail-safe level, and allowing manufacturing and implementation at low costs.

It is still another object to technically allow the microcomputer to start up quickly at the time of start-up, thereby providing improved start-up performance to the engine.

SUMMARY OF THE INVENTION

The means according to the invention as set forth in claim 1 of the present inventions for solving the aforementioned technical problems provides a method for controlling ignition timing of an ignition device for a capacitive discharge internal combustion engine, the ignition device including an ignition coil having an ignition plug connected to a secondary side, a generator coil in a high-voltage magneto generator driven by the internal combustion engine, a rechargeable capacitor provided on a primary side of the ignition coil and recharged by a forward voltage portion of an output voltage from the generator coil, and a dischargeable switching element for discharging electric charges of the rechargeable capacitor to a primary coil of the ignition coil by conduction. The method comprises the step of generating a cycle detection signal at an ignition timing calculation start point in time at which the forward voltage portion of the output voltage from the generator coil has reached a preset cycle detection voltage as a voltage making continual ignition operations available to calculate an RPM in accordance with the cycle detection signal and prepare an ignition timing calculation signal for determining an ignition timing signal or a temporal signal corresponding to the RPM calculated. The method further comprises the step of generating a peak voltage detection signal at a peak detection point in time at which a delayed reverse voltage portion of the output voltage from the generator coil has reached a peak voltage, and generating a start-up voltage detection signal at a start-up point in time at which the delayed reverse voltage portion has reached a start-up voltage, the start-up voltage being set to a value which allows for staying as close as possible to the top dead center of the internal combustion engine and for being reliably detected after the peak detection point in time with the cycle detection signal having been output. The method also comprises the steps of outputting an ignition signal to the dischargeable switching element immediately after the peak detection point in time at a standby speed setting or less; outputting the ignition signal to the dischargeable switching element after a duration of the ignition timing signal obtained by the ignition timing calculation signal from the ignition timing calculation start point in time at the standby speed or more; and outputting the ignition signal to the dischargeable switching element at the start-up point in time at the time of a start-up.

The invention as set forth in claim 1 is adapted to obtain the cycle detection signal, the peak voltage detection signal, and the start-up voltage detection signal from the output voltage from the generator coil in the ignition device for the capacitive discharge internal combustion engine. The ignition signal is output in accordance with an ignition timing signal provided by the cycle detection signal, the peak voltage detection signal, or the start-up voltage detection signal, thus eliminating the need for a pulser coil or a coil for outputting the ignition signal or detecting an RPM.

In the speed region of the stand-by speed or less including an idling speed, the high-voltage magneto generator installed in the internal combustion engine allows the ignition signal to be output immediately after the peak detection point in time that is set at the ignition position for reducing fuel consumption or a position close thereto. This allows the internal combustion engine to operate in a stand-by state with reduced fuel consumption (with no load coupled thereto in an idling state).

In the speed region of the stand-by speed or more, the ignition signal is output after an ignition period determined in accordance with each RPM from the ignition timing calculation start point in time that is set at the position allowing for obtaining a time to calculate the ignition timing at a position previous and close to the most desired position for ignition in this speed region until the most desired position for ignition is reached. This allows the ignition operation to be carried out at an advance level that is most suitable for each RPM, thereby providing sufficiently improved output from the internal combustion engine to efficiently operate the coupled load.

At the time of start-up, the ignition operation is performed at a start-up point in time at which a slight advancement or almost no advancement is provided with respect to the top dead center of the internal combustion engine with the cycle detection signal having been output, i.e., under the condition in which the RPM of the internal combustion engine has reached a speed that enables the generator coil to generate an output voltage allowing for continual ignition operations. This allows the internal combustion engine to start safely without any kickback. In addition, since the start-up voltage is set at a value allowing for being reliably detected, the internal combustion engine is reliably started.

In addition to the configuration of the invention according to claim 1, the invention as set forth in claim 2 further comprises the step of starting to count the ignition timing signal obtained by the ignition timing calculation signal at the ignition timing calculation start point in time in a running speed region between the standby speed setting and an operation speed higher than the standby speed.

In the invention as set forth in claim 2, the level of advancement of the ignition timing is set in accordance with the RPM of the internal combustion engine in the running speed region for operating a load between the standby speed and an operation speed, thereby making it possible to provide an increase or a decrease in output as required.

In addition to the configuration of the invention according to claim 1, the invention as set forth in claim 3 further comprises the step of counting the ignition timing signal, obtained by the ignition timing calculation signal calculated at the previous ignition timing calculation start point in time, from the subsequent ignition timing calculation start point in time in a high speed region of the operation speed setting or more.

In the invention as set forth in claim 3, the time of the ignition timing calculation signal is longer than the ignition timing calculated in the high speed region of the operation speed or more, thereby making it impossible to set a proper ignition timing. Thus, the ignition timing calculated in the previous cycle is used as the ignition timing for the current cycle, thereby allowing ignition operations to continue without significantly missing the ignition timing.

That is, in the high-speed region of the operation speed or more, since it is not required to increase the RPM but rather to restrict an increase in the RPM, the ignition operation performed in accordance with the ignition timing of the previous cycle will not cause the ignition timing to advance, thus allowing the RPM to be restricted.

In addition to the configuration of the invention according to claim 1, the invention as set forth in claim 4 further comprises the step of counting the ignition timing signal, obtained by the ignition timing calculation signal calculated at the ignition timing calculation start point in time, immediately after the peak detection point in time occurring in the same cycle as said ignition timing calculation start point in time, in a speed region of a lower limit speed setting or less in which a rotational operation of the internal combustion engine is unstable.

In the invention as set forth in claim 4, since the peak detection point in time stays originally at a position suitable for carrying out an ignition operation, the calculated ignition timing signal being counted immediately after the peak detection point in time will not cause the ignition timing to significantly advance with respect to the top dead center of the internal combustion engine even when a rotational operation of the internal combustion engine is unstable causing the period of the cycle to be elongated irregularly. This assures the rotational operation of the internal combustion engine to be reliably continued.

In addition to the configuration of the invention according to claim 1, the invention as set forth in claim 5 further comprises the step of outputting the ignition signal to the dischargeable switching element immediately after the peak detection point in time, in a speed region between the lower limit speed setting and the standby speed setting.

As described above, in the invention as set forth in claim 5, since the peak detection point in time originally stays at a position suitable for carrying out an ignition operation, the ignition operation is performed immediately after the peak detection point in time, thereby providing a stable rotational operation to the internal combustion engine.

The means according to the invention, as set forth in claim 6, of the present inventions provides an ignition timing control device incorporated into an ignition device for a capacitive discharge internal combustion engine, the ignition device including an ignition coil having an ignition plug connected to a secondary side, a generator coil in a high-voltage magneto generator driven by the internal combustion engine, a rechargeable capacitor provided on a primary side of the ignition coil and recharged by a forward voltage portion of an output voltage from the generator coil, and a dischargeable switching element for discharging electric charges of the rechargeable capacitor to a primary coil of the ignition coil by conduction. The ignition timing control device calculates RPMs of an internal combustion engine and outputs an ignition signal or a trigger signal to a dischargeable switching element of the ignition device in accordance with an ignition timing signal or a temporal signal for the RPMs or each of the RPMS. The ignition timing control device comprises a constant voltage power supply portion, a microcomputer portion, a cycle signal generation portion, and a voltage detection portion. The constant voltage power supply portion recharges a reverse voltage portion of the output voltage from the generator coil and supplies a constant voltage output to the microcomputer portion, the cycle signal generation portion, and the voltage detection portion. The cycle signal generation portion generates a cycle detection signal at an ignition timing calculation start point in time at which the forward voltage portion of the output voltage from the generator coil has reached a preset cycle detection voltage as a voltage making continual ignition operations available. The voltage detection portion outputs the delayed reverse voltage portion of the output voltage from the generator coil as a voltage signal. The microcomputer portion calculates an RPM using a time between the ignition timing calculation start point in time or an input point in time of an input cycle detection signal to the subsequent ignition timing calculation start point in time to prepare an ignition timing calculation signal for determining an ignition timing signal or a temporal signal corresponding to the RPM so as to generate a peak voltage detection signal at a peak detection point in time at which the delayed reverse voltage portion has reached a peak voltage in accordance with the input voltage signal. On the other hand, the microcomputer portion generates a start-up voltage detection signal at a start-up point in time at which the voltage signal has reached a start-up voltage, the start-up voltage being set to a value which allows for staying as close as possible to the top dead center of the internal combustion engine and for being reliably detected after the peak detection point in time with the cycle detection signal having been output. The microcomputer portion outputs an ignition signal to the dischargeable switching element after a duration of the ignition timing signal obtained by the ignition timing calculation signal from the peak detection point in time at a standby speed setting or less. The microcomputer portion also outputs the ignition signal to the dischargeable switching element after a duration of the ignition timing calculation signal obtained by the ignition timing calculation signal from the ignition timing calculation start point in time at the standby speed or more. The microcomputer portion also outputs the ignition signal to the dischargeable switching element at the start-up point in time at the time of a start-up.

The invention as set forth in claim 6 is adapted to obtain the cycle detection signal, the peak voltage detection signal, and the start-up voltage detection signal from the output voltage of the generator coil in the ignition device for the capacitive discharge internal combustion engine. The ignition signal is output in accordance with an ignition timing signal provided by the cycle detection signal, the peak voltage detection signal, or the start-up voltage detection signal, thus eliminating the need for a pulser coil or a coil for outputting the ignition signal or detecting an RPM. The constant voltage power supply portion is also provided for recharging the reverse voltage portion of the output voltage from the generator coil and outputting the constant voltage output to the microcomputer portion, the cycle signal generation portion, and the voltage detection portion, thereby eliminating a battery.

The cycle detection signal obtained by the forward voltage and the voltage signal obtained by the reverse voltage are obtained separately at the respectively dedicated cycle signal generation portion and voltage detection portion. This allows for simplifying the circuit configurations of the cycle signal generation portion and the voltage detection portion and as well reliably providing a stabilized cycle detection signal and voltage signal with improved accuracy.

In the speed region of the stand-by speed or less, the high-voltage magneto generator installed in the internal combustion engine allows the internal combustion engine to operate in a stand-by state with reduced fuel consumption. In the speed region of the stand-by speed or more, this allows the ignition operation to be carried out at an advance level that is most suitable for each RPM, thereby providing sufficiently improved output from the internal combustion engine to efficiently operate the coupled load. At the time of start-up, since the start-up voltage is set at a value allowing for a safe start-up and for being reliably detected, the internal combustion engine is reliably started.

In addition to the configuration of the invention according to claim 6, the invention as set forth in claim 7 comprises the microcomputer portion having a microcomputer incorporating a reset IC, in which a constant voltage output from the constant voltage power supply portion is set to a value close to an upper limit value of an operable voltage of the microcomputer and the constant voltage power supply portion outputs a constant voltage output, thereby canceling a reset to the microcomputer by the reset IC.

The invention as set forth in claim 7 is adapted such that a constant voltage output from the constant voltage power supply portion is set to a value close to an upper limit value of an operable voltage of the microcomputer. Even when a surge noise is included in the constant voltage output signal from the constant voltage power supply portion, this makes it possible to sufficiently reduce the ratio of magnitude of the value of the surge noise to the constant voltage output value. This in turn makes it possible to almost completely eliminate an adverse effect of the surge noise on the microcomputer.

Furthermore, the constant voltage power supply portion is adapted to output a constant voltage output, thereby canceling a reset to the microcomputer by the reset IC. This allows for starting the microcomputer when the RPM of the internal combustion engine is at a value for outputting the constant voltage output signal to the constant voltage power supply portion. Thus, with the microcomputer having been started or at the time of start-up, the internal combustion engine stays at the position allowing for a stable rotational operation, thereby providing a very good start-up characteristic to the internal combustion engine.

The means according to the invention as set forth in claim 8 of the present inventions provides a method for controlling ignition timing during a low speed of an ignition device for a capacitive discharge internal combustion engine, the ignition device including an ignition coil having an ignition plug connected to a secondary side, a generator coil in a high-voltage magneto generator driven by the internal combustion engine, a rechargeable capacitor provided on a primary side of the ignition coil and recharged by a forward voltage portion of an output voltage from the generator coil, and a dischargeable switching element for discharging electric charges of the rechargeable capacitor to a primary coil of the ignition coil by conduction. The method comprises the step of generating a cycle detection signal at an ignition timing calculation start point in time at which the forward voltage portion has reached a preset cycle detection voltage as a voltage making continual ignition operations available, to calculate an RPM in accordance with the cycle detection signal. The method further comprises the steps of generating a peak voltage detection signal at a peak detection point in time at which a delayed reverse voltage portion of the output voltage from the generator coil has reached a peak voltage, and generating a start-up voltage detection signal at a start-up point in time at which the delayed reverse voltage portion has reached a start-up voltage, the start-up voltage being set to a value which allows for staying as close as possible to the top dead center of the internal combustion engine outside a kickback area and for being reliably detected after the peak detection point in time with the cycle detection signal having been output. The method further comprises the step of dividing the delayed reverse voltage portion with respect to the start-up voltage at a division ratio determined by a preset advancement angle characteristic line and a tolerance range setting to obtain a constant voltage characteristic line indicative of angle/speed characteristics with each divided value being made constant, in a low speed region of a lower limit speed or less or a lower limit of a speed region in which the engine rotates with stability, to output an ignition signal to the dischargeable switching element at a point in time at which a value of the delayed reverse voltage portion matches a value on the constant voltage characteristic line within the tolerance range. The method further comprises the step of outputting the ignition signal to the dischargeable switching element at the start-up point in time at the time of a start-up.

The invention as set forth in claim 8 is adapted to obtain the cycle detection signal, the peak voltage detection signal, and the start-up voltage detection signal from the output voltage from the generator coil in the ignition device for the capacitive discharge internal combustion engine. The ignition signal is output in accordance with an ignition timing signal provided by the cycle detection signal, the peak voltage detection signal, or the start-up voltage detection signal, thus eliminating the need for a pulser coil or a coil for outputting the ignition signal or detecting an RPM.

At the time of start-up, the ignition operation is performed at a start-up point in time at which a slight advancement or almost no advancement is provided with respect to the top dead center of the internal combustion engine with the cycle detection signal having been output, i.e., under the condition in which the RPM of the internal combustion engine has reached the speed that enables the generator coil to generate an output voltage allowing for continual ignition operations. This allows the internal combustion engine to start safely without any kickback. In addition, since the start-up voltage is set at a value allowing for being reliably detected, the internal combustion engine is reliably started.

In the low speed region, including the time of start-up, of the lower limit speed or less, which tends to be unstable in the rotational operation state of the engine, the ignition signal is output at the position (the rotation angle position) at which the value of the delayed reverse voltage portion at the time of the calculated RPM is coincident with any of each constant voltage characteristic line within a tolerance range.

As described above, the value of the delayed reverse voltage portion is coincident with any of each constant voltage characteristic line within a tolerance range, thereby outputting the ignition signal. Thus, the ignition operation is performed when the value of the delayed reverse voltage portion has reached a value ensuring a reliable ignition operation without any influence from unstable rotation of the engine, thereby providing a stabilized ignition operation.

The means according to the invention as set forth in claim 9 of the present inventions provides a method for controlling ignition timing of an ignition device for a capacitive discharge internal combustion engine, the method making use of an effect of preventing over-rotation, the ignition device including an ignition coil having an ignition plug connected to a secondary side, a generator coil in a high-voltage magneto generator driven by the internal combustion engine, a rechargeable capacitor provided on a primary side of the ignition coil and recharged by a forward voltage portion of an output voltage from the generator coil, and a dischargeable switching element for discharging electric charges of the rechargeable capacitor to a primary coil of the ignition coil by conduction provided by an ignition signal being input. The method comprises the step of generating a cycle detection signal at an ignition timing calculation start point in time at which the forward voltage portion of the output voltage from the generator coil has reached a preset cycle detection voltage as a voltage making continual ignition operations available to detect an RPM of the internal combustion engine in accordance with a time between adjacent cycle detection signals, and determine the RPM detected being less than or equal to a preset operation upper limit speed as in a normal ignition operation state in which the dischargeable switching element is conducted or interrupted for ignition operations. The method comprises the steps of determining the RPM being above the operation upper limit speed as in a misfire state for stopping ignition operations with the dischargeable switching element being kept under a conduction sustain state as well as generating a preparatory cycle detection signal at a point in time at which a leading reverse voltage portion of the output voltage occurring immediately before the forward voltage portion has reached a preset preparatory cycle detection voltage to detect an RPM in accordance with a time between adjacent preparatory cycle detection signals, such that when the detected RPM is lower than the operation upper limit speed, the dischargeable switching element is to be released from the conduction sustain state and restored to the normal ignition operation state in order to prevent over-rotation.

With the RPM of the internal combustion engine being above the operation upper limit speed, the dischargeable switching element is determined to be in the conduction sustain state, with the ignition device being in the misfire state. However, the ignition operation having been stopped in this misfire state causes the RPM of the internal combustion engine to reliably start reducing, thus reliably preventing the RPM from increasing up to a dangerous region.

In the misfire state of the ignition device, the RPM is detected in accordance with the leading reverse voltage portion that is not affected by the armature reaction of the forward voltage portion of the output voltage from the generator coil. Thus, like in the normal ignition operation state, the RPM of the internal combustion engine can be always reliably detected with accuracy, thereby making it possible to accurately detect in real time the level of a decrease in the RPM of the internal combustion engine due to a misfire.

In addition to the configuration of the invention according to claim 9, the invention as set forth in claim 10 further comprises the step of presetting an ignition recovery speed which restores the ignition device from a misfire state to a normal ignition operation state and is below the operation upper limit speed, to set the ignition recovery speed to a value which causes no trouble under a load condition and at which the operation upper limit speed is not reached immediately after recovery.

The invention as set forth in claim 10 is adapted to set the difference between the ignition recovery speed and the operation upper limit speed to such an extent that causes no trouble in operating a load. Thus, this difference in speed is set to as small a value as possible that does not cause a significant variation in the rotational operation of the internal combustion engine when the ignition device is restored from a misfire state to the normal ignition operation state.

Furthermore, the difference between the ignition recovery speed and the operation upper limit speed is set to such a value that does not allow the RPM to reach the operation upper limit speed immediately after the RPM is at the ignition recovery speed causing the ignition operation to be restored. This ensures preventing the occurrence of an erroneous operation in which the operation state of the ignition device is frequently switched between the misfire state and the normal ignition operation state near the operation upper limit speed.

In addition to the configuration of the invention according to claim 9 or 10, the invention as set forth in claim 11 further comprises the step of setting the preparatory cycle detection voltage to a peak value of the leading reverse voltage portion of the output voltage.

In the invention as set forth in claim 11, the preparatory cycle detection voltage can be preset as a specific voltage not to compare the voltage with an input voltage but to monitor a change in the leading reverse voltage portion of the output voltage and detect the point of change in polarity of the voltage. This allows for simplifying the necessary circuit configuration and ensuring a stable detection operation.

The means according to the invention as set forth in claim 12 of the present inventions provides an ignition circuit for a capacitive discharge internal combustion engine, the ignition circuit including an ignition coil having an ignition plug connected to a secondary side, a generator coil in a high-voltage magneto generator driven by the internal combustion engine, a rechargeable capacitor provided on a primary side of the ignition coil and recharged by a forward voltage portion of an output voltage from the generator coil, and a dischargeable switching element for discharging electric charges of the rechargeable capacitor to a primary coil of the ignition coil by conduction provided by an ignition signal being input. The means provides a method for controlling ignition timing of an ignition device for the internal combustion engine for a stop operation, the ignition circuit incorporating an ignition timing control device for generating a cycle detection signal at an ignition timing calculation start point in time at which the forward voltage portion has reached a preset cycle detection voltage as a voltage making continual ignition operations available to detect an RPM of the internal combustion engine in accordance with a time between adjacent cycle detection signals and output the ignition signal to the dischargeable switching element as required. The method comprises the steps of short-circuiting a forward terminal of the generator coil and a ground to disable the occurrence of the cycle detection signal, and continually outputting the ignition signal when a time from the cycle detection signal that occurred most recently is longer than a preset stop time having been set assuming that is shorter than a short-circuit time between the forward terminal of the generator coil and the ground and longer than at least one cycle of the internal combustion engine during the short-circuiting.

In the invention as set forth in claim 12, the short-circuiting between the forward terminal of the generator coil and the ground prevents the forward voltage portion of the output voltage from occurring, thereby allowing no cycle detection signal to occur and be output.

When the time from the last cycle detection signal output, i.e., the time from the cycle detection signal that occurred most recently is longer than a preset stop time having been set assuming that it is shorter than a short-circuit time between the forward terminal of the generator coil and the ground, the ignition signal continues to be output until the ignition signal is not to be output, i.e., until the internal combustion engine has come to a stop.

Continual output of the ignition signal sustains the dischargeable switching element in the conduction state, thus allowing the short-circuiting between the forward terminal of the generator coil and the ground to be released. Thus, even when the forward voltage portion is induced in the generator coil, the induced forward voltage portion is branched by means of the dischargeable switching element without being used to recharge the dischargeable switching element. For this reason, no ignition operation is performed until the internal combustion engine stops, thus causing the internal combustion engine to come to a complete stop.

That is, even when the short-circuit time has elapsed, and the short-circuiting between the forward terminal of the generator coil and the ground has been released, the forward terminal of the generator coil is in the grounded state by means of the dischargeable switching element, thereby allowing no ignition operation to be performed.

Furthermore, even in a case where the portion for controlling ignition has failed causing the control over the ignition timing to be disabled, sustaining the short-circuiting between the forward terminal of the generator coil and the ground ensures the ignition operation to be stopped causing the internal combustion engine to come to a complete stop, thereby providing high safety.

In addition to the configuration of the invention according to claim 12, the invention as set forth in claim 13 further comprises the step of setting the stop time to a time slightly longer than three cycles of the internal combustion engine during the short-circuiting between the forward terminal of the generator coil and the ground.

In the invention as set forth in claim 13, even when a misfire resulting from a noise or surge occurs in the ignition device of an internal combustion engine, an abnormal stop resulting from the surge is prevented from occurring. This is because the misfire resulting from the surge never occurs twice consecutively in almost any case. Even when a misfire resulting from the surge occurs twice consecutively, the period of time of the misfire state resulting from the surge never exceeds three cycles of the internal combustion engine, thus it is possible to avoid taking a signal accompanying the misfire resulting from the surge for a stop signal. Thus, an abnormal stop resulting from the surge is prevented.

The means according to the invention as set forth in claim 14 of the present inventions provides a capacitive discharge internal combustion engine with an ignition circuit including an ignition coil having an ignition plug connected to a secondary side, a generator coil in a high-voltage magneto generator driven by the internal combustion engine, a rechargeable capacitor provided on a primary side of the ignition coil and recharged by a forward voltage portion of an output voltage from the generator coil, and a dischargeable switching element for discharging electric charges of the rechargeable capacitor to a primary coil of the ignition coil by conduction provided by an ignition signal being input. The means also provides an ignition device for the internal combustion engine, the ignition device having an ignition timing control device incorporated into the ignition circuit, the ignition timing control device calculating an RPM of the internal combustion engine and outputting an ignition signal or a trigger signal to a dischargeable switching element in accordance with an ignition timing signal or a temporal signal for the RPMs or each of the RPMs. The ignition timing control device comprises a constant voltage power supply portion, a microcomputer portion, and a cycle signal generation portion. The constant voltage power supply portion recharges a reverse voltage portion of an output voltage from the generator coil and supplies an output of a constant voltage to the microcomputer portion and the cycle signal generation portion. The cycle signal generation portion generates a cycle detection signal at an ignition timing calculation start point in time at which the forward voltage portion of the output voltage from the generator coil has reached a preset cycle detection voltage as a voltage making continual ignition operations available. The microcomputer portion calculates an RPM in accordance with a time from the ignition timing calculation start point in time or a point in time of input of the cycle detection signal input for a subsequent ignition timing calculation start point in time and outputs the ignition signal to the dischargeable switching element as required. The ignition timing control device comprises a stop switch, disposed between a forward terminal of the generator coil and a ground, serving as a self-reset normally open contact; and a stop counter for clearing a count of a stop time in accordance with the cycle detection signal, the stop time being preset in the microcomputer portion as a time shorter than a short-circuit time provided by the stop switch and longer than at least one cycle of the internal combustion engine at a time of short-circuiting, and for instructing to continually output the ignition signal when the number of counts is greater than the stop time.

In the invention as set forth in claim 14, while the internal combustion engine is assuming a rotational operation in the normal condition, the cycle detection signal is output each cycle. This causes the count of the stop time provided by the stop counter to be cleared each cycle, allowing the count to be started from the beginning.

For this reason, at any time the short-circuiting between the forward terminal of the generator coil and the ground occurs, the counting of the stop time is reliably carried out with accuracy.

The stop time is set to a time that is longer than at least one cycle of the internal combustion engine that is providing a rotational operation in the normal condition. This allows the count of the stop time never to exceed the preset stop time, thereby causing the ignition signal to be output only when required to provide a proper ignition operation.

Furthermore, the cycle detection signal obtained by an ignition operation is employed as a count clear signal for the stop time. Thus, as long as the ignition device works properly, the count of the stop time is reliably cleared, thereby ensuring an abnormal stop of the internal combustion engine being reliably prevented.

Switching operation of the stop switch to short-circuit the forward terminal of the generator coil and the ground in order to stop the internal combustion engine prevents the forward voltage portion of the output voltage of the generator coil from occurring, causing no cycle detection signal to be generated.

Since no cycle detection signal is generated as described above, the counting of the stop time provided by the stop counter started in accordance with the last cycle detection signal continues without being cleared by the cycle detection signal. When the total count time is longer than the stop time, the stop counter outputs a command for continually outputting the ignition signal.

The command for continually outputting the ignition signal is provided through counting up of the stop time shorter than the short-circuiting time. Thus, at the point in time at which the stop switch restores itself from the ON state to the OFF state, the dischargeable switching element has already been sustained at the conduction state in accordance with the ignition signal. Since this allows the forward terminal of the generator coil to be in the grounded state via the dischargeable switching element, no forward voltage portion is raised in the generator coil, thereby disabling the ignition causing the internal combustion engine to come to a stop.

In addition to the configuration of the invention according to claim 14, the invention as set forth in claim 15 is adapted such that the stop time is set at approximately 100 msec.

The invention as set forth in claim 15 reliably prevents the occurrence of a problem of the internal combustion engine being disabled to stop, which results from the short-circuit time being shorter than the stop time. Since the short-circuit time between the forward terminal of the generator coil and the ground, provided by the manually operated stop switch, is 250 msec to 500 msec on average, the occurrence of the problem of the short-circuit time being shorter than the stop time is prevented.

Furthermore, in the ignition device for an internal combustion engine, a misfire resulting from an abnormal surge never occurs twice consecutively. Except in the case of an emergency, the internal combustion engine is desirably stopped with the coupling of a load being released by the clutch, thus almost unexceptionally in the upper half region of the idling range in which the internal combustion engine is providing a stable rotational operation (at an RPM of approximately 2000 to 4000). Since the time of one cycle of the internal combustion engine at that time is 30 msec to 15 msec, the time is approximately 90 msec at most even when a misfire resulting from a surge occurs twice consecutively. Thus, a misfire signal resulting from a surge will never be taken for a stop signal, providing a safe stop operation.

The means according to the invention as set forth in claim 16 of the present inventions provides a method for controlling an ignition timing to start an ignition device for an internal combustion engine. The ignition device has an ignition timing control device incorporated into an ignition circuit for a capacitive discharge internal combustion engine. The ignition circuit includes an ignition coil having an ignition plug connected to a secondary side, a generator coil in a high-voltage magneto generator driven by the internal combustion engine, a rechargeable capacitor provided on a primary side of the ignition coil and recharged by a forward voltage portion of an output voltage from the generator coil, and a dischargeable switching element for discharging electric charges of the rechargeable capacitor to a primary coil of the ignition coil by conduction provided by an ignition signal being input. The ignition timing control device comprises a microcomputer portion for receiving a cycle detection signal generated at an ignition timing calculation start point in time at which the forward voltage portion of the output voltage has reached a preset cycle detection voltage as a voltage making continual ignition operations available to detect an RPM of the internal combustion engine in accordance with a time between adjacent cycle detection signals and output the ignition signal to the dischargeable switching element as required, and a constant voltage power supply portion for partially restrictively recharging a reverse voltage portion of the output voltage with a current limiting resistor to operate the microcomputer portion by the recharged power. The method comprises the step of bypassing the current limiting resistor of the constant voltage power supply portion at the time of a start-up to allow the constant voltage power supply portion to recharge most of the reverse voltage portion of output voltage generated, such that the recharge voltage from the constant voltage power supply portion is raised to a constant voltage range in which the microcomputer portion can be quickly operated.

The invention as set forth in claim 16 allows the reverse voltage portion of the output voltage to be recharged to the constant voltage power supply portion almost directly without being limited by the current limiting resistor, thus allowing the recharging charges from the constant voltage power supply portion to be quickly recharged. This allows the recharge voltage to quickly reach the microcomputer start-up voltage which is required to start the microcomputer in the microcomputer portion, thereby starting the microcomputer at a very early stage.

The microcomputer is started at a very early stage as described above, which ensures reliable outputting of the cycle detection signal, necessary to generate an ignition signal, at an early stage of the start-up operation. This ensures reliable occurrence of the ignition operation at an early stage of the start-up operation.

In addition to the configuration of the invention according to claim 16, the invention as set forth in claim 17 further comprises the step of allowing the reverse voltage portion of the output voltage to conduct a bypass path of the current limiting resistor of the constant voltage power supply portion.

In the invention as set forth in claim 17, the bypass path of the current limiting resistor in the constant voltage power supply portion is formed at the same time as the rising edge of the reverse voltage portion of the output voltage. This allows the reverse voltage portion generated to be recharged at nearly to the constant voltage power supply portion, thus allowing the recharge voltage of the constant voltage power supply portion to reach very quickly the microcomputer start-up voltage.

In addition to the configuration of the invention according to claim 16, the invention as set forth in claim 18 further comprises the step of allowing the microcomputer portion to receive a first cycle detection signal to thereby interrupt the bypass path of the current limiting resistor.

In the invention as set forth in claim 18, the absolute value of the forward voltage portion of the output voltage for generating the cycle detection signal is sufficiently greater than the absolute value of the microcomputer start-up voltage of the reverse voltage portion of the output voltage. Thus, when a cycle detection signal is output, the constant voltage power supply portion is already in a sufficiently recharged state ensuring that the microcomputer has already started. This eliminates the need for quick recharging of the constant voltage power supply portion, thus blocking the bypass path of the current limiting resistor to stop the quick recharging of the constant voltage power supply portion.

As described above, the quick recharging is stopped as soon as possible to return to the normal recharging condition. This is because of problems in that a drop in voltage (output voltage) occurring in the generator coil of the ignition circuit causes a decrease in energy released to the secondary side of the ignition coil, and a distortion in the output voltage waveform of the generator coil causes an error to occur in the ignition timing.

The means according to the invention as set forth in claim 19 of the present inventions provides an ignition timing control device for an ignition device for an internal combustion engine. The ignition device has an ignition timing control device incorporated into an ignition circuit for a capacitive discharge internal combustion engine. The ignition circuit includes an ignition coil having an ignition plug connected to a secondary side, a generator coil in a high-voltage magneto generator driven by the internal combustion engine, a rechargeable capacitor provided on a primary side of the ignition coil and recharged by a forward voltage portion of an output voltage from the generator coil, and a dischargeable switching element for discharging electric charges of the rechargeable capacitor to a primary coil of the ignition coil by conduction provided by an ignition signal being input. The ignition timing control device comprises a microcomputer portion for receiving a cycle detection signal generated at an ignition timing calculation start point in time at which the forward voltage portion has reached a preset cycle detection voltage as a voltage making continual ignition operations available to detect an RPM of the internal combustion engine in accordance with a time between adjacent cycle detection signals and output the ignition signal to the rechargeable switching element as required, and a constant voltage power supply portion for having a reverse voltage portion of the output voltage recharged partially restrictively with a current limiting resistor to operate the microcomputer portion by the recharged power. The constant voltage power supply portion incorporates a quick-recharging portion comprising a rechargeable switching element, connected in parallel to the current limiting resistor of the constant voltage power supply portion, allowed to quickly conduct by the reverse voltage portion of the output voltage, and a turn-on transistor, connected between a control terminal of the rechargeable switching element and the ground, turned on by a trigger signal from the microcomputer portion to interrupt the rechargeable switching element.

In the invention as set forth in claim 19, the rechargeable switching element connected in parallel to the current limiting resistor of the constant voltage power supply portion is allowed to quickly conduct by the reverse voltage portion of the output voltage to form a bypass path of the current limiting resistor. This allows most of the reverse voltage portion generated to be recharged as it is to the constant voltage power supply portion, thereby realizing a quick recharging of the constant voltage power supply portion.

The turn-off transistor is turned on in response to the trigger signal from the microcomputer portion to stop the quick recharging operation of the quick recharging portion. This allows the microcomputer portion to freely provide control to stop the quick recharging operation of the quick recharging portion.

Therefore, for example, the trigger signal from the microcomputer portion to the turn-off transistor can be quickly output in response to the entry of the first cycle detection signal, thereby allowing the start-up performance of the internal combustion engine not to be affected by the quick recharging of the constant voltage power supply portion.

Furthermore, the quick recharging portion basically includes the rechargeable switching element for being self-triggered in accordance with the reverse voltage portion of the output voltage, and the turn-off transistor for placing the rechargeable switching element in a non-conducting state in response to the trigger signal from the microcomputer portion, providing a very simple configuration to the quick recharging portion.

In addition to the configuration of the invention according to claim 19, the invention as set forth in claim 20 further comprises a rectifying diode connected in series with the rechargeable switching element.

The invention as set forth in claim 20 is adapted to prevent the problem in that, without a rectifying diode capable of blocking backflow between the voltage recharge portion of the constant voltage power supply portion and the current limiting resistor, placing the rechargeable switching element in a non-conducting state causes the recharging charge from the voltage recharge portion of the constant voltage power supply portion to be discharged through the turn-off transistor.

In addition to the configuration of the invention according to claim 19 or 20, the invention as set forth in claim 21 further comprises a protective resistor having a low resistance connected in series with the rechargeable switching element.

In the invention as set forth in claim 21, to prevent a large reverse voltage portion of the output voltage from working on the rechargeable switching element and electronic components of the constant voltage power supply portion as a large surge, the reverse voltage portion is received at the protective resistor and then supplied to the rechargeable switching element and the electronic components of the constant voltage power supply portion. This allows the rechargeable switching element and the electronic components of the constant voltage power supply portion to be protected from the reverse voltage portion.

In addition to the configuration of the invention according to claim 19, 20, or 21, the invention as set forth in claim 22 further comprises a thyristor as the rechargeable switching element.

In the invention as set forth in claim 22, the thyristor is self-triggered in accordance with the reverse voltage portion of the output voltage, thereby being ensured to conduct in response to the rising edge of the reverse voltage portion. This ensures the quick recharging of the reverse voltage portion of the constant voltage power supply portion to be achieved at once.

THE BEST MODE FOR CARRYING OUT THE INVENTION

Now, the present invention will be explained below with reference to the accompanying drawings in accordance with the embodiments.

Figure 1:
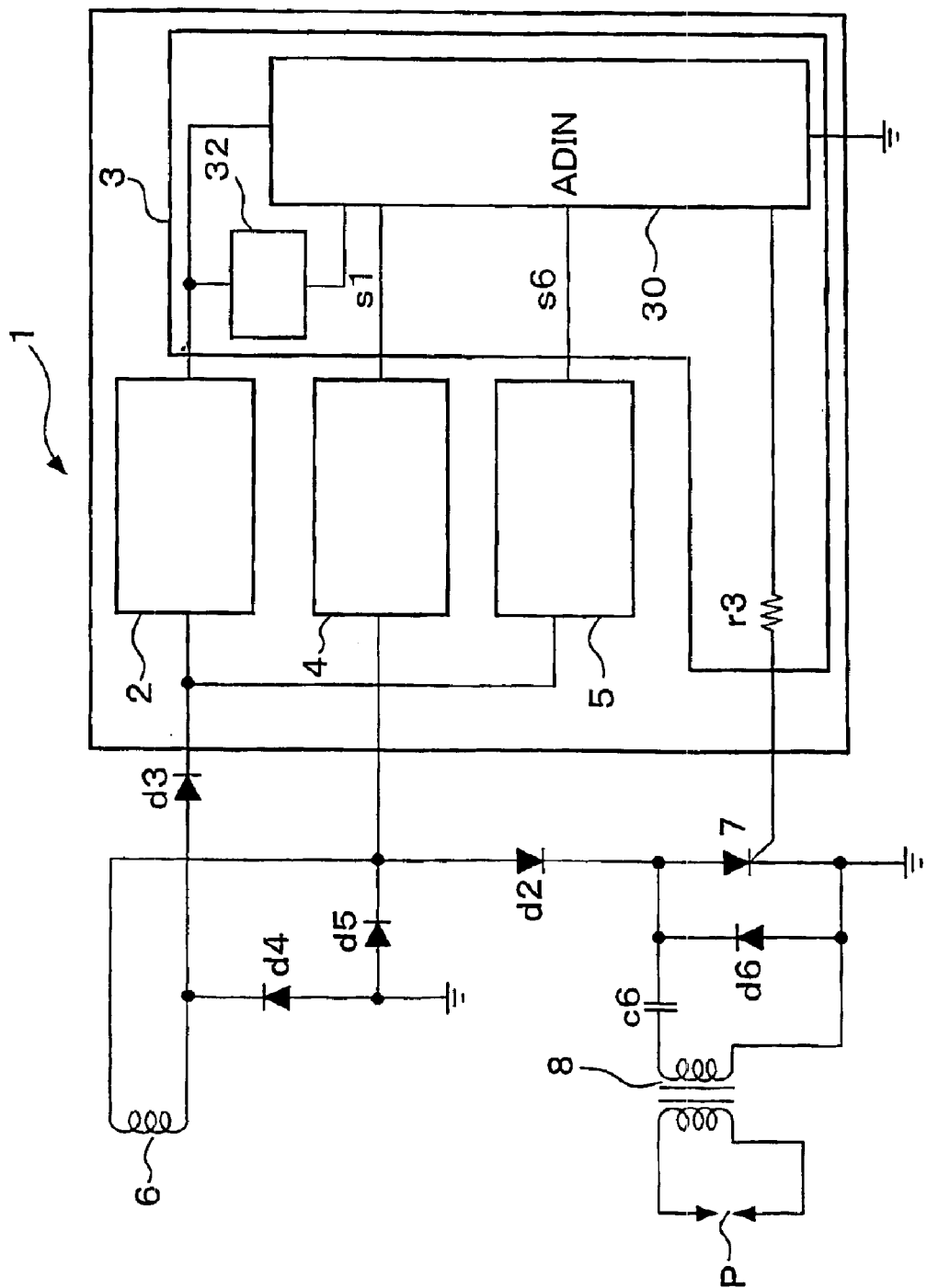
FIG. 1 is a block circuit diagram illustrating an example of a basic configuration of an ignition timing control device according to the present invention.
Figure 2:
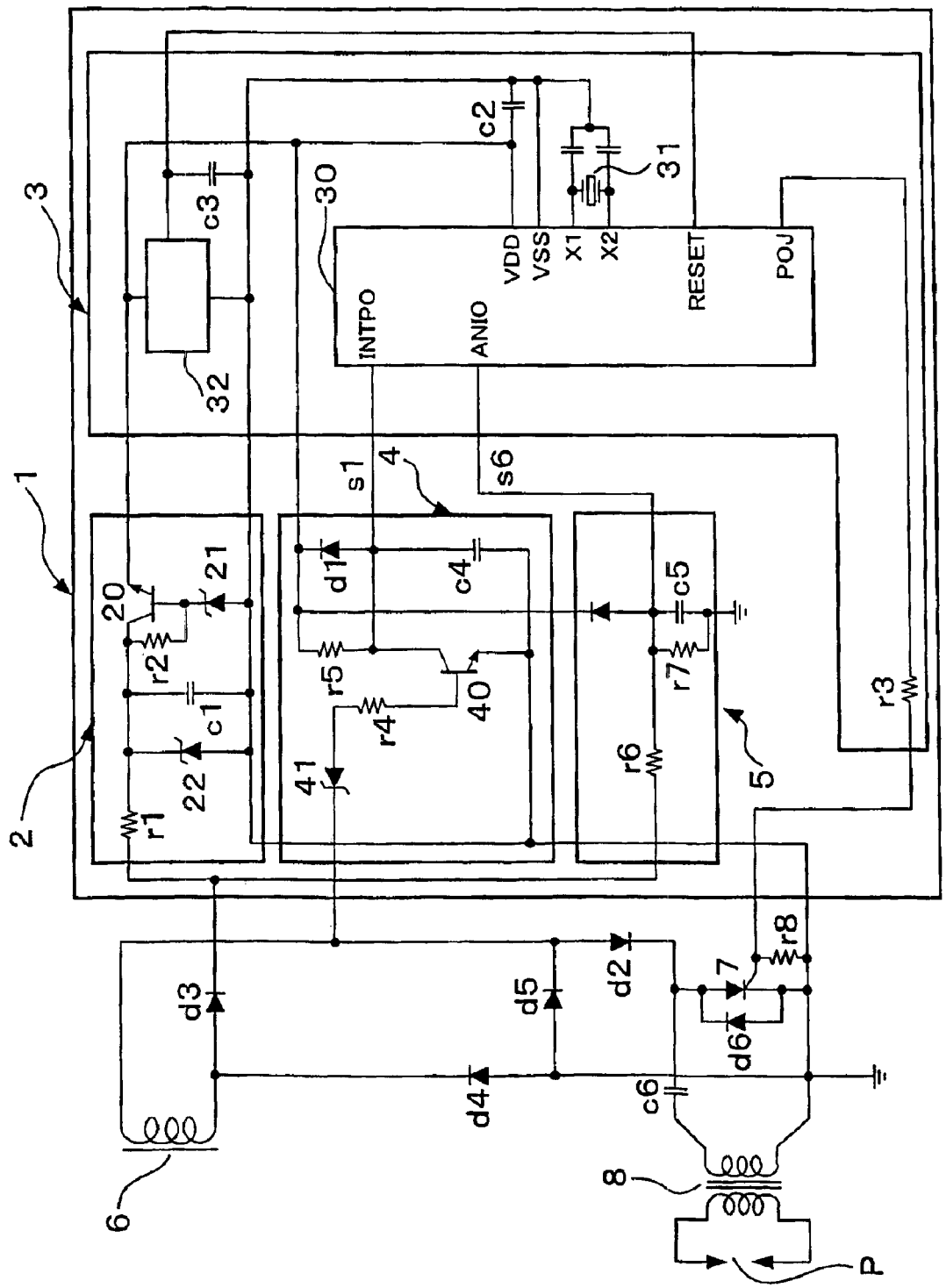
FIG. 2 is a detailed view illustrating the embodiment shown in FIG. 1.

FIG. 1 is a block circuit diagram illustrating a basic circuit configuration of an ignition timing control device 1 according to the present invention, the ignition timing control device 1 constituting an ignition device for an internal combustion engine in combination with a capacitive discharge ignition circuit. The ignition timing control device 1 includes a constant voltage power supply portion 2, a microcomputer portion 3, a cycle signal generation portion 4, and a voltage detection portion 5, each of the components being detailed in FIG. 2.

The capacitive discharge ignition circuit incorporating the ignition timing control device 1 includes an ignition coil 8 having an ignition plug P connected to a secondary side, a generator coil 6 constituting a high-voltage magneto generator driven by the internal combustion engine, a rechargeable capacitor c6 provided on a primary side of the ignition coil 8 and recharged by a forward voltage portion e1 of an output voltage E from the generator coil 6, and a dischargeable switching element 7 for discharging electric charges of the rechargeable capacitor c6 to a primary coil of the ignition coil 8 by conduction.

The forward voltage portion e1 of the output voltage E induced in the generator coil 6 is recharged to the rechargeable capacitor c6 via a rechargeable diode d2. The charges recharged in the rechargeable capacitor c6 are discharged to the primary coil of the ignition coil 8 in response to a trigger provided by the dischargeable switching element 7 with a thyristor which has a discharge energy regenerative diode d6 connected in parallel in the reverse direction and a gate stabilizing resistor r8 connected thereto. This causes a high voltage to be induced in the secondary coil of the ignition coil 8 to generate a spark discharge at the ignition plug, thereby providing an ignition operation to the internal combustion engine.

Figure 3:
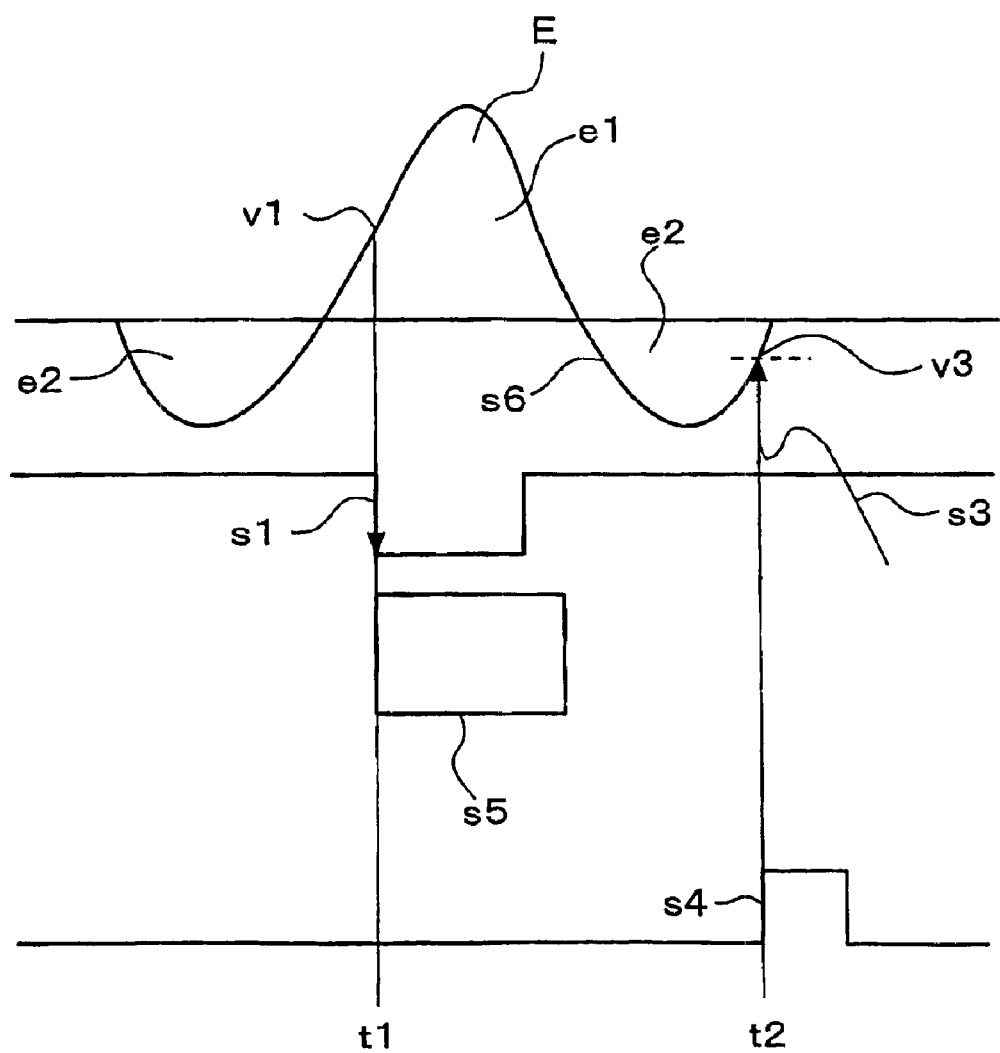
FIG. 3 is a performance diagram illustrating an example of the operation performed upon start-up according to the present invention.

The constant voltage power supply portion 2 of the ignition timing control device 1 is recharged with the reverse voltage portion e2 of the output voltage E from the generator coil 6 (see FIG. 3) in order to supply a constant output voltage to the microcomputer portion 3, the cycle signal generation portion 4, and the voltage detection portion 5. A reverse voltage portion e2 of the output voltage E from the generator coil 6, rectified by a rectifying diode d3, is recharged via the current limiting resistor r1 into a power supply capacitor c1 having an over-voltage preventing zener diode 23 connected in parallel. When this recharge voltage reaches a preset certain voltage, a voltage stabilizing transistor 21 having a voltage stabilizing zener diode 22 and a base resistor r2 connected to its base conducts to output a constant voltage.

The value of the constant voltage from the constant voltage power supply portion 2 is set at a value close to the upper limit value of the operable voltage of a microcomputer 30 in the microcomputer portion 3, more specifically, at 5V, thereby avoiding the influence of a surge noise even if the surge noise is added to a constant voltage output signal.

The microcomputer portion 3 includes the microcomputer 30 and a reset IC 32. The reset IC 32, which is inserted for connection between the output terminals of the constant voltage power supply portion 2, connects its output terminal having a reset noise filtering capacitor c3 to a reset port of the microcomputer 30. The reset IC 32 detects the output voltage from the constant voltage power supply portion 2 reaching a preset certain value to start the microcomputer 30.

The microcomputer 30 incorporating a clock generator 31 receives a constant voltage signal from the constant voltage power supply portion 2 via a power supply noise filtering capacitor c2, and then outputs an ignition signal s4 via an ignition signal supply resistor r3.

The cycle signal generation portion 4 provides a constant voltage signal from the constant voltage power supply portion 2 to a signal generation transistor 40 via a waveform shaping resistor r5. The cycle signal generation portion 4 then allows the series circuit of a detection zener diode 41 and a voltage detection resistor r4, connected to the base of the signal generation transistor 40, to turn on the signal generation transistor 40 when the forward voltage portion e1 of the output voltage E from the generator coil 6 exceeds a preset cycle detection voltage v1. Then, the cycle signal generation portion 4 outputs a potential at the connection between the signal generation transistor 40 and the waveform shaping resistor r5 to the microcomputer portion 3 as a cycle detection signal s1. The series circuit of the signal generation transistor 40 and the waveform shaping resistor r5 is connected in parallel with a series circuit of a noise filtering diode d1 and a noise filtering capacitor c4.

When the RPM of the internal combustion engine is in a normal ignition operation condition without an operation upper limit speed z1 being exceeded, the voltage detection portion 5 adds the delayed reverse voltage portion e2 of the output voltage E from the generator coil 6 to a series circuit of a voltage setting divider resistor r6 and a voltage setting divider resistor r7, and then outputs the voltage at the division point in between both the voltage setting divider resistors r6 and r7 to the microcomputer portion 3 as a voltage signal s6. There is also connected a noise filtering capacitor c5 between the divided point of both the voltage setting divider resistors r6, r7 and the ground.

Furthermore, when the RPM of the internal combustion engine is in a misfire state with the operation upper limit speed z1 being exceeded, the voltage detection portion 5 outputs the voltage signal s6 obtained from the leading reverse voltage portion e2 of the output voltage E from the generator coil 6 to the microcomputer portion 3.

The cycle detection voltage v1 set at the cycle signal generation portion 4 is set, for example, to approximately 40V in accordance with the value of the forward voltage portion e1 obtained in the RPM region in which the internal combustion engine can be started in a stabilized manner. The constant voltage output signal from the constant voltage power supply portion 2 is also output at almost the same time as the value of the forward voltage portion e1 reaches the cycle detection voltage v1, thereby allowing the microcomputer 30 to be started at almost the same time as the cycle detection signal s1 is output.

Upon receiving the cycle detection signal s1, the microcomputer 30 defines this point in time of input as an ignition timing calculation start point in time t1 to measure the time to the subsequent ignition timing calculation start point in time t1 and thereby calculate the RPM. The microcomputer 30 then selects an ignition timing corresponding to the calculated RPM from a number of pieces of pre-stored data, thereby preparing an ignition timing calculation signal s5 for the cycle in which the subsequent ignition timing calculation start point in time t1 stays.

Furthermore, upon receiving the voltage signal s6 from the voltage detection portion 5, the microcomputer 30 supplies the signal to an A/D converter to prepare a peak voltage detection signal s2 for detecting the voltage value of the delayed reverse voltage portion e2 having reached a peak voltage v2, and a start-up voltage detection signal s3 for detecting the voltage value having reached a value which allows for staying as close as possible to the top dead center of the internal combustion engine outside a kickback area m and for being reliably detected, e.g., a start-up voltage v3 set at 0.3V.

Then, upon receiving the voltage signal s6 provided by the leading reverse voltage portion e2 from the voltage detection portion 5 in the misfire state, the microcomputer 30 supplies this signal to the A/D converter to prepare a preparatory cycle detection signal s7 for detecting the voltage value of the leading reverse voltage portion e2 having reached a peak value or a preparatory cycle detection voltage v4.

Now, the operational steps of the ignition device will be explained in the order in which they appear from the time of start-up.

A rotational operation is provided to the internal combustion engine, thereby causing the constant voltage power supply portion 2 to output a certain voltage. The reset IC 32 detects this voltage to release the reset of the microcomputer 30 to start it, allowing the microcomputer 30 to be initialized and then driven into a stand-by state.

A first cycle detection signal s1 input under this state (see FIG. 3 for the descriptions given here) allows the preset start-up voltage v3 to be detected from the voltage signal s6 that is received immediately thereafter in response thereto, causing the start-up voltage detection signal s3 to be generated. Following the occurrence of the start-up voltage detection signal s3, the ignition signal s4 is output at once to the dischargeable switching element 7 in the ignition circuit to perform an ignition operation, thereby ensuring a safe start-up of the internal combustion engine.

The ignition operation performed with its ignition timing being at the start-up point in time t2 is reliably performed with safety without causing kickback. Thus, during an early stage in the start-up in which the rotational operation is not always stabilized, or in the start-up mode, running is carried out with the ignition timing being at the start-up point in time t2 for a preset period of time or in the speed region of a lower limit speed x (e.g., 1500 rpm) or less.

Figure 4:
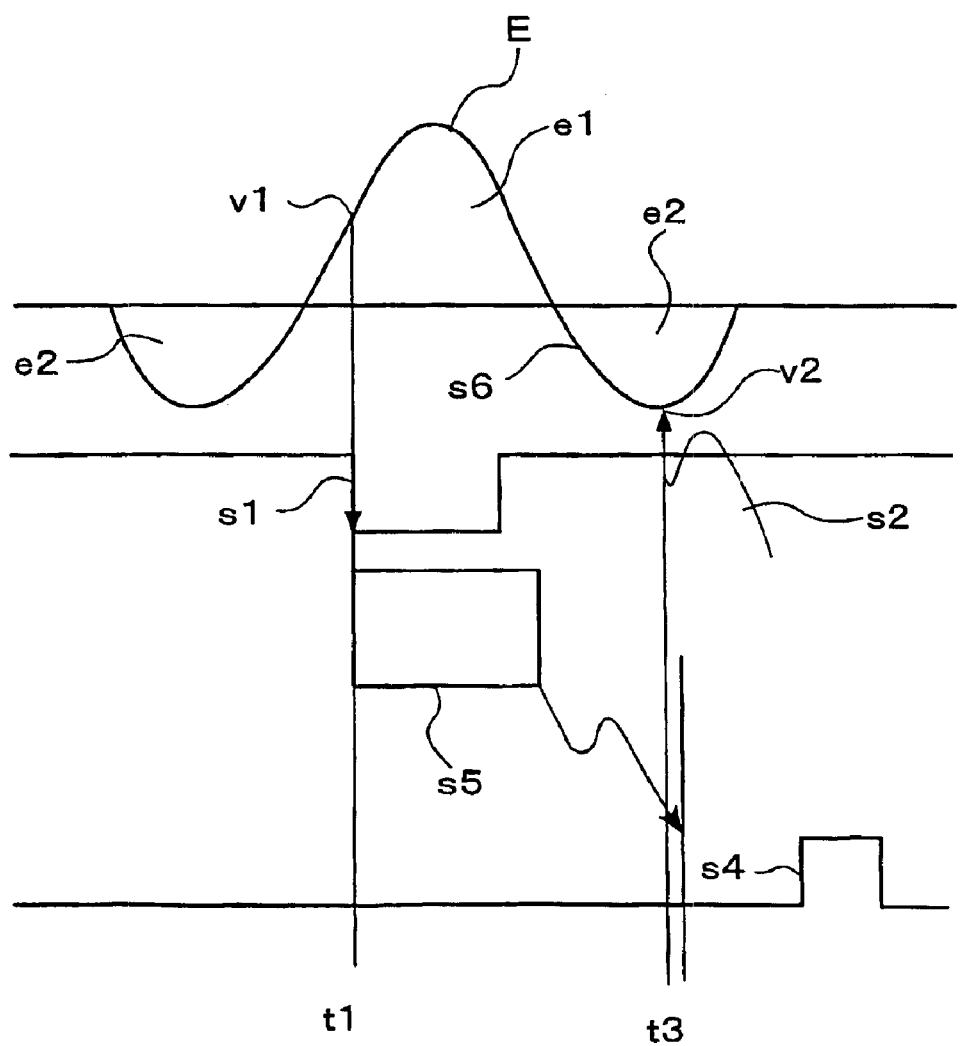
FIG. 4 is a performance diagram illustrating an example of the operation performed within a range of a lower limit speed or less according to the present invention.

In a case where the RPM of the internal combustion engine becomes the lower limit speed x or less after the start-up mode has finished, as shown in FIG. 4, the ignition timing obtained by the ignition timing calculation signal s5 in the same cycle is counted from immediately after the peak detection point in time to output the ignition signal s4 after the counting.

As described above, in the speed region in which the RPM of the internal combustion engine is at the lower limit speed x or less and in which full use cannot be made of the fly-wheel effect and the internal combustion engine rotates not always with stability, a calculated ignition timing is counted immediately after the peak detection point in time to set the ignition timing. This allows the ignition timing not to significantly advance with respect to the top dead center of the internal combustion engine even when the rotational operation of the internal combustion engine is unstable causing the period of its cycle to be elongated. Thus, it is ensured to sustain the ignition operation in the internal combustion engine.

Figure 5:
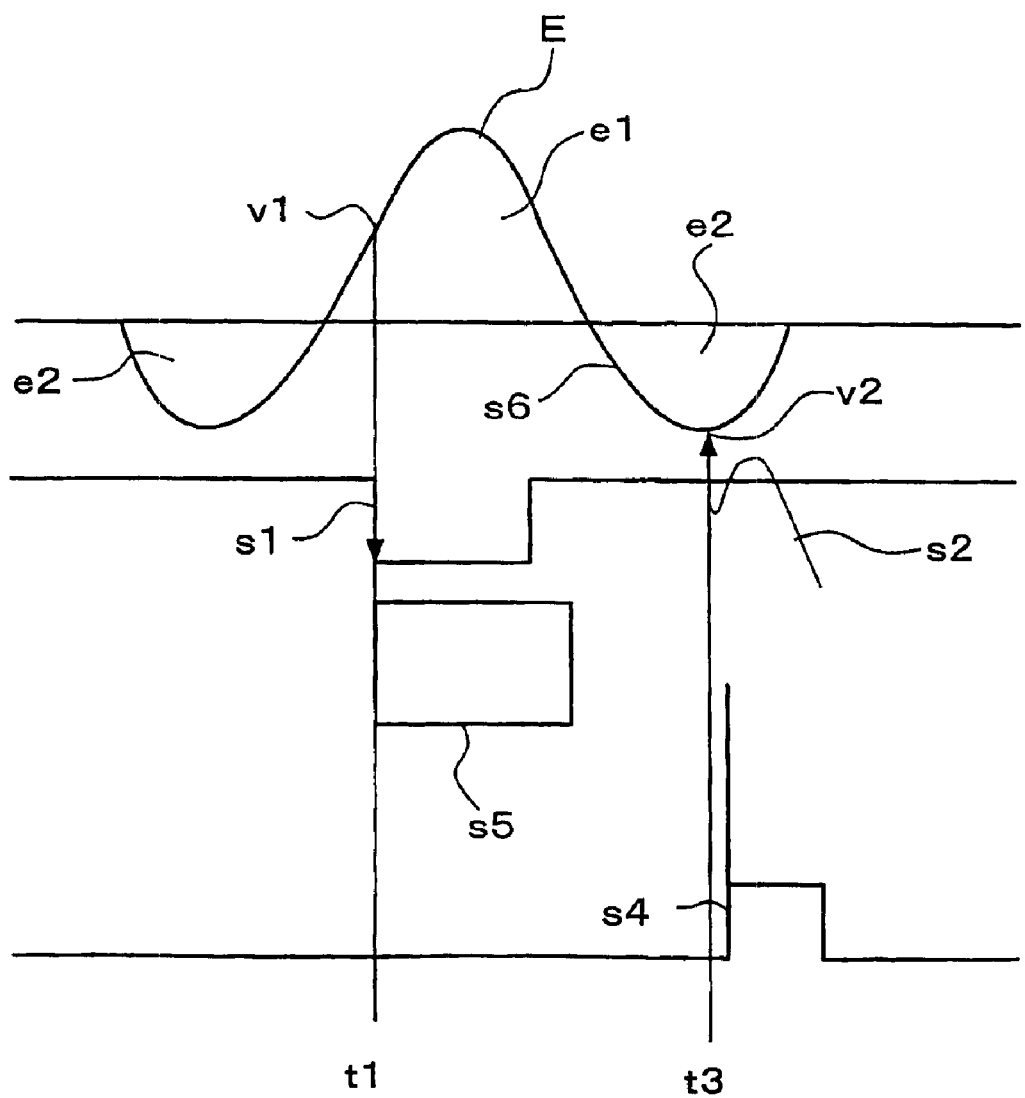
FIG. 5 is a performance diagram illustrating an example of the operation performed within the range from the lower limit speed to a stand-by speed according to the present invention.

In a case where the RPM of the internal combustion engine has risen to a speed range from the lower limit speed x at which the rotational operation is stabilized to a preset standby speed y at which a load can be coupled (e.g., 4000 rpm), as shown in FIG. 5, the ignition signal s4 is output immediately after a peak detection point in time t3 at which the peak voltage detection signal s2 having detected the peak voltage v2 is output.

As described above, in this speed range from the lower limit speed x to the standby speed y, the ignition timing is immediately after the peak detection point in time t3. The "immediately after the peak detection point in time t3" means "after confirming the detection of a peak voltage." This confirmation processing is set so as to be longer with decreasing RPMs, thereby allowing for a slight advancement in the ignition timing within this speed range.

Figure 6:
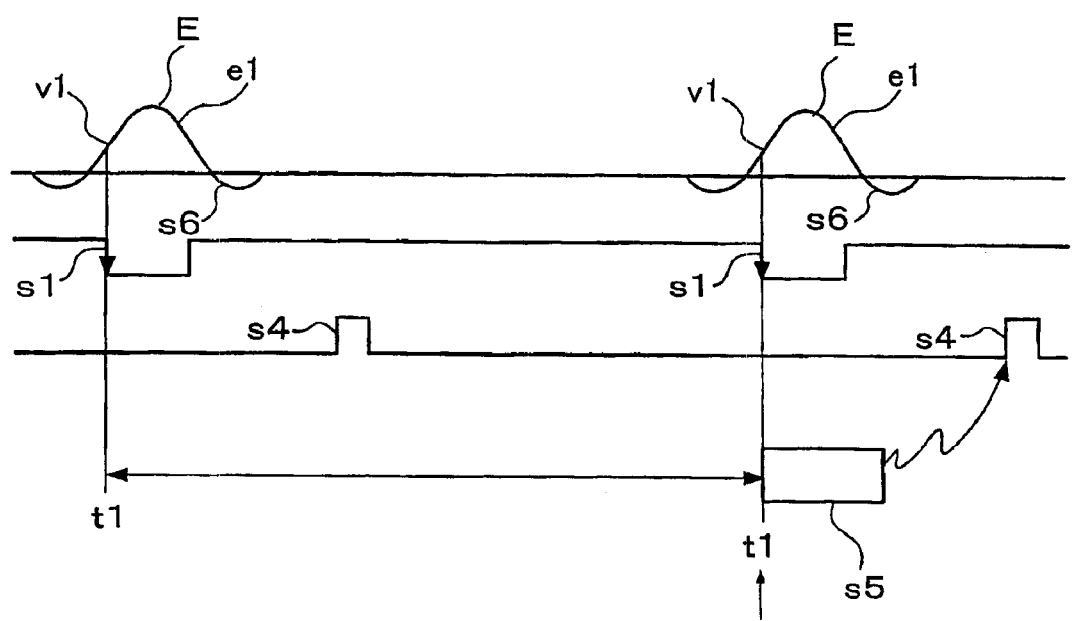
FIG. 6 is a performance diagram illustrating an example of the operation performed within the range from the stand-by speed to an operation speed according to the present invention.

In a case where the RPM of the internal combustion engine lies in the speed range from the standby speed y at which a load can be coupled for operation to a preset operation speed z (e.g., 8000 rpm) which is almost an upper limit for an efficient operation, as shown in FIG. 6, the RPM at the current ignition timing calculation start point in time t1 is calculated in accordance with the time from the ignition timing calculation start point in time t1 or the point in time of input of the previous cycle detection signal s1 to the current ignition timing calculation start point in time t1. The ignition timing calculation signal s5 for selecting a pre-stored and preset ignition timing signal corresponding to the calculated RPM is obtained. The ignition timing signal obtained by the ignition timing calculation signal s5 is counted from the current ignition timing calculation start point in time t1 to output the ignition signal s4 after the time of the ignition timing signal has elapsed.

In the speed range region from the standby speed y to the operation speed z, the advancement most suitable for each RPM can be obtained, thereby making it possible to sufficiently enhance the output from the internal combustion engine and provide an efficient operation to the load coupled.

Figure 7:
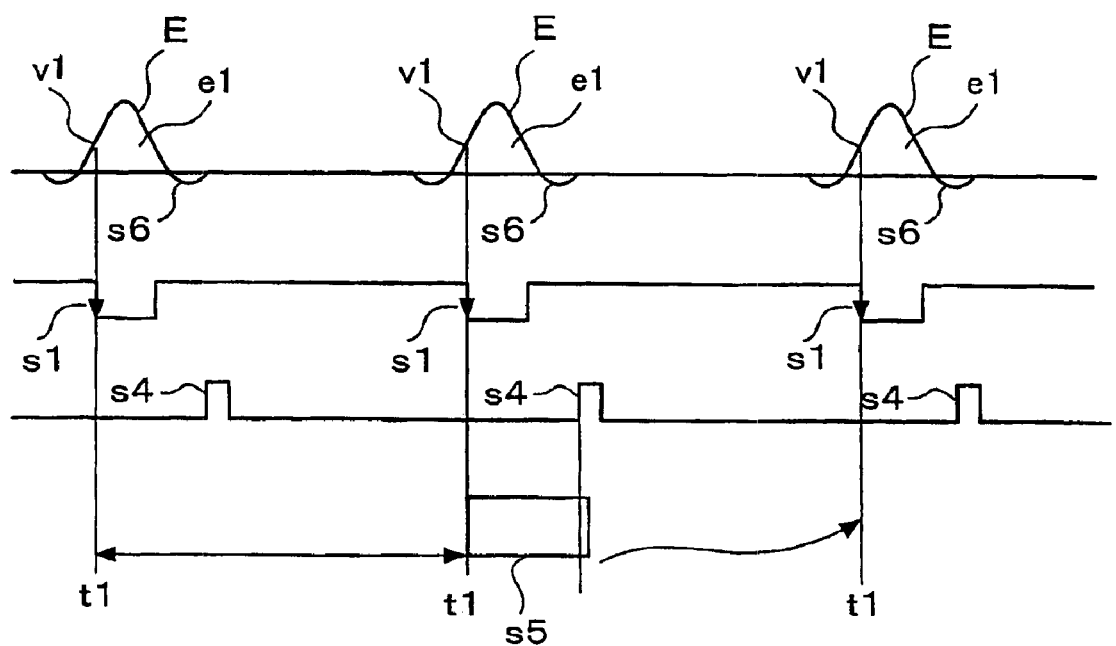
FIG. 7 is a performance diagram illustrating an example of the operation performed within the range of the operation speed or more according to the present invention.

In a case where the RPM of the internal combustion engine has exceeded the operation speed z, as shown in FIG. 7, the ignition timing calculation signal s5 becomes longer in time than the resulting ignition timing signal, thereby making it impossible to obtain the ignition signal s4. For this reason, the ignition timing signal obtained by the ignition timing calculation signal s5 in the previous cycle is used as it is in the subsequent cycle.

In this case, as a matter of course, the efficiency of the internal combustion engine is reduced, thus causing an increase in the speed of the internal combustion engine to be restricted and thereby bringing about the over-rotation prevention effect.

Figure 8:
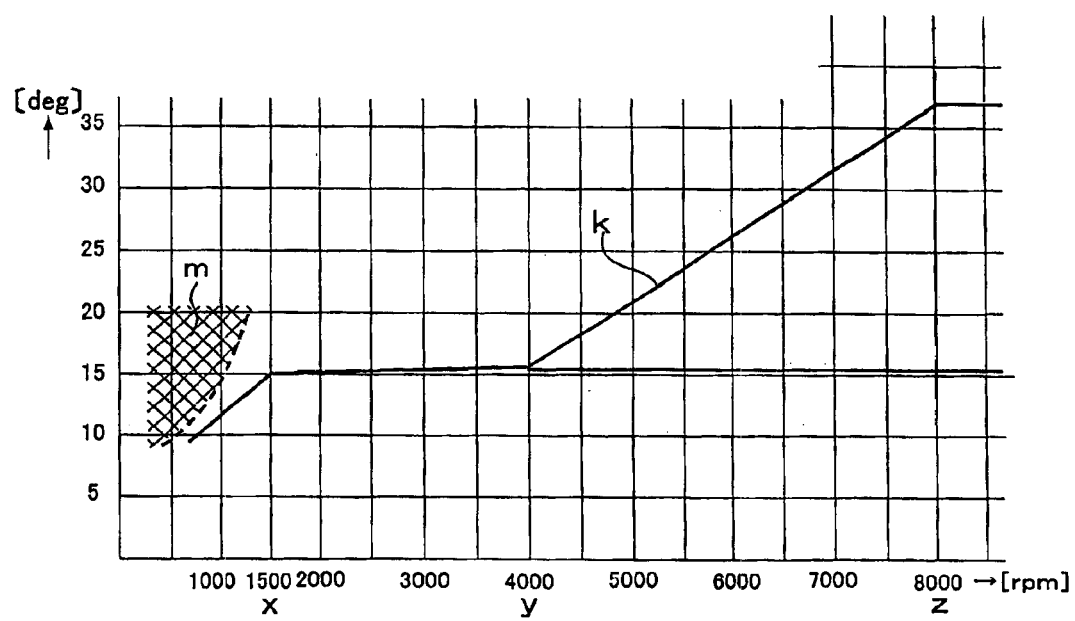
FIG. 8 is a characteristic diagram illustrating an example of a preset setting advancement angle characteristic line.
Figure 9:
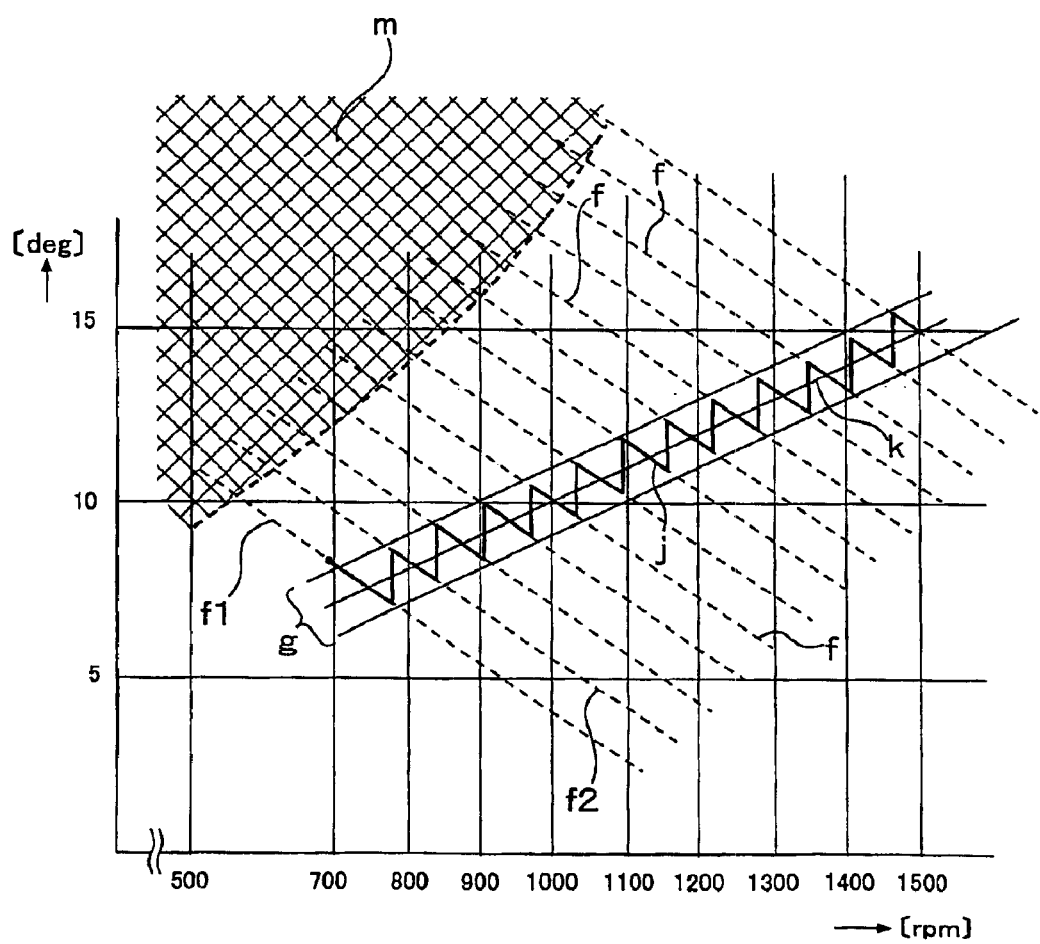
FIG. 9 is a characteristic diagram illustrating a detailed low speed region in the characteristic diagram shown in FIG. 8.

The portion in the microcomputer 30 corresponding to the voltage detection portion 5 is provided with a preset advancement angle characteristic line k shown in FIG. 8. However, the advancing operation shown in FIG. 9 is performed in the region of low speeds, less than or equal to the lower limit speed x or the lower limit for providing a stable rotational operation to the engine, the rotational operation being not always stabilized in this region because the fly-wheel effect cannot be brought about fully.

That is, the voltage signal s6 after the peak voltage v2 at the lower limit speed x is divided with respect to the start-up voltage v3 at the division ratio determined in accordance with the preset advancement angle characteristic line k and a tolerance range g (e.g., a rotational angle of 2 degrees) to obtain a plurality of constant voltage characteristic lines f.

Under this condition (see FIG. 9 for the descriptions below), the first cycle detection signal s1 is input. In accordance with the voltage signal s6 input immediately thereafter following the cycle detection signal s1 and irrespective of the RPM and the tolerance range g, the lowest constant voltage characteristic line f1 obtained with respect to the start-up voltage v3 as the division point is employed to detect the start-up voltage v3 to generate the start-up voltage detection signal s3. Following the occurrence of the start-up voltage detection signal s3, the ignition signal s4 is output at once to the dischargeable switching element 7 of the ignition circuit to perform an ignition operation for start-up.

The cycle detection signal s1 is obtained in accordance with the cycle detection voltage v1 which allows the internal combustion engine to reliably perform an ignition operation and which the internal combustion engine can obtain by reaching a rotational speed region. The start-up voltage v3 is set so as to stay outside the kickback area m, thereby allowing the internal combustion engine to reliably start with safety without causing kickback.

In the next ignition operation or the second ignition operation, an RPM is calculated in accordance with the cycle detection signal s1 provided at the time of start-up, allowing an ignition operation when the value of the voltage signal s6 after the peak voltage v2 is equal to the value of an actual advancement angle characteristic line j at the time of the RPM calculated.

For example, in a case where the calculated RPM is 750 rpm, within the tolerance range g, only the constant voltage characteristic line f1 corresponds to an RPM of 750 rpm. Thus, the ignition operation is performed when the value of the voltage signal s6 is equal to the value of the voltage to be set by the constant voltage characteristic line f1, i.e., the same voltage value as the start-up voltage v3.

When the RPM of the engine reaches 800 rpm, within the tolerance range g, the constant voltage characteristic line f that corresponds to the RPM of 800 rpm is only a second constant voltage characteristic line f2. Thus, the ignition operation is performed when the value of the voltage signal s6 has reached the value of the voltage to be set by the constant voltage characteristic line f2, for example, 0.45V.

That is, the actual advancement angle characteristic line j in the low speed region, including the time of start-up, of the lower limit speed x (e.g., 1500 rpm) or less exhibits a sawtooth-like advancing operation in which the actual advancement angle characteristic line j steps up to a higher constant voltage characteristic line f in sequence with increasing RPMs.

As described above, in the low speed region, an ignition timing is not determined in accordance with the calculated time elapsing from a certain preset point in time as in the prior art but determined in accordance with the value of the input voltage signal s6 reaching a preset voltage value. Accordingly, even when a variation in rotational operation of the engine occurs causing a substantial drop in RPM, a safe reliable ignition operation can be performed without any possibility that the ignition timing is significantly advanced in an abnormal manner causing a kickback to occasionally occur.

In a case where the RPM of the internal combustion engine increased to the high-speed region further increases above the operation upper limit speed z1 preset as the upper limit at which a load can be safely operated (e.g., 15000 rpm) (see FIG. 11(c)), the microcomputer 30 detects and determines this condition as the over-rotation state, immediately allowing the ignition signal s4 to be continually output (see FIG. 11(d)) to sustain the dischargeable switching element 7 in the conduction state and determining the internal combustion engine to be in the misfire state. Furthermore, the microcomputer 30 detects the preparatory cycle detection voltage v4 or the peak voltage of the voltage signal s6 obtained by the leading reverse voltage portion e2 of the output voltage E to output the preparatory cycle detection signal s7 (see FIG. 11(b)), detecting the RPM based on measurement on the time between adjacent preparatory cycle detection signals s7.

When the RPM detected from the adjacent preparatory cycle detection signals s7 has decreased to an ignition recovery speed z2 (e.g., 14900 rpm) (see FIG. 11(c)) preset as a speed slightly lower than the operation upper limit speed z1, the microcomputer 30 determines that the RPM has been restored to the normal rotational speed range (from the standby speedy to the operation upper limit speed z1). Thus, the microcomputer 30 stops the continual outputting of the ignition signal s4 (see FIG. 11(d)) and restores the detection of the RPM to the normal cycle measurement using the cycle detection signal s1.

Figure 10:
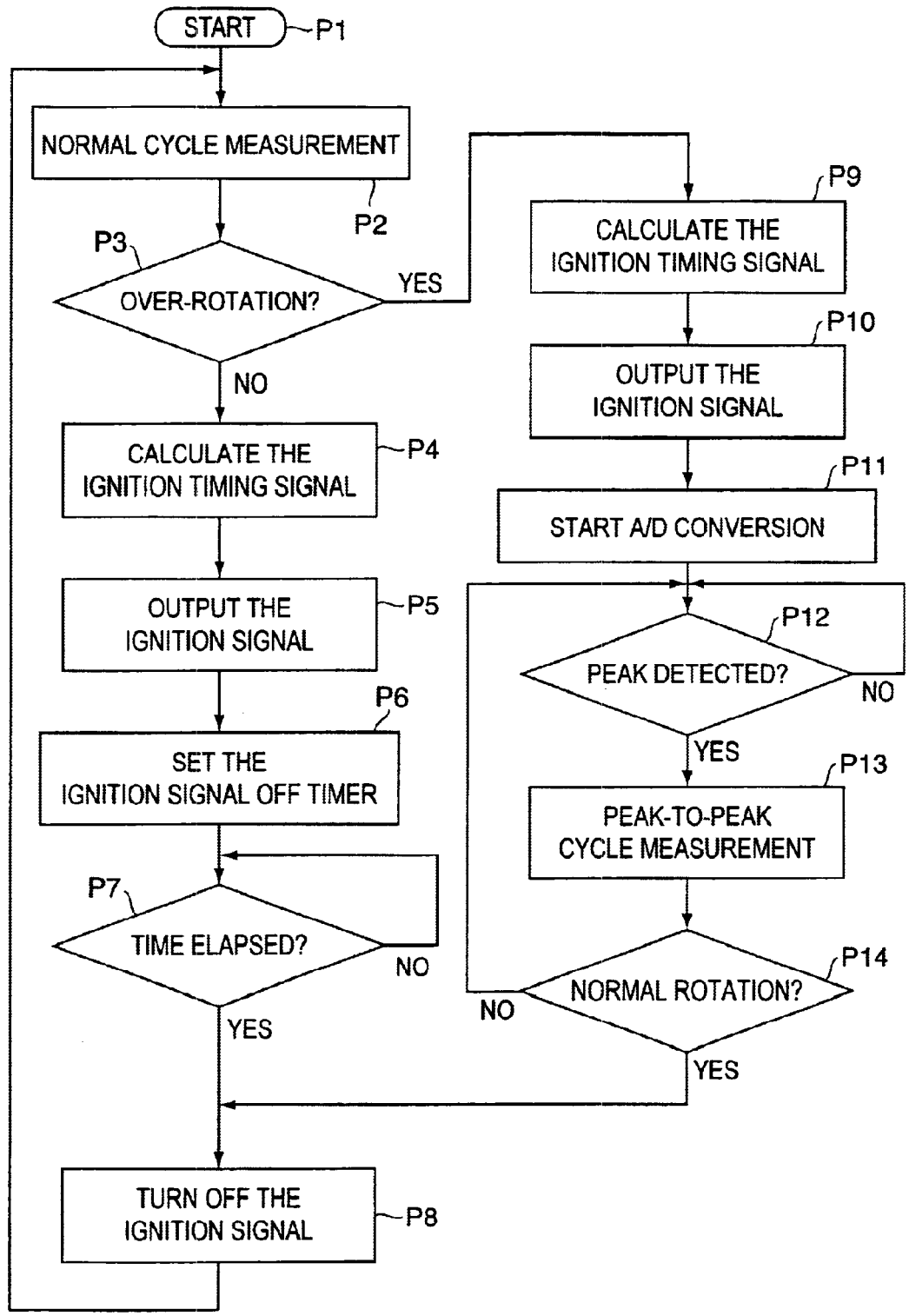
FIG. 10 is a flowchart illustrating an example of ignition operation control provided to an internal combustion engine according to the present invention.

That is, the control of the ignition signal s4 by the microcomputer 30 is as shown in the flowchart illustrated in FIG. 10. In the normal rotational speed range, the initial setting is completed in step p1. Then, in step p2, the normal cycle measurement is carried out using the cycle detection signal s1 to detect an RPM. In step p3, it is determined whether the detected RPM is in an over-rotation state, i.e., whether the detected RPM is above the operation upper limit speed z1.

If the RPM is determined to be not in the over-rotation state, the process proceeds to step p4 to generate an ignition timing signal in accordance with the ignition timing calculation signal s5 and then in step p5, outputs the ignition signal s4 in response to the ignition timing signal for an ignition operation.

After having carried out step p5, the process immediately sets an ignition signal OFF timer for turning off the ignition signal s4 in step p6. Then, in step p7, the process monitors whether the time set by the ignition signal OFF timer has elapsed. If the time has elapsed, the process turns off the ignition signal s4 in step p8, and then returns to step p2 to thereafter repeat this flow each time of an ignition so as to perform an ignition operation in the normal rotational speed range.

In the over-rotation range in which the RPM has been determined in step p3 to be in the over-rotation state, at first, the process performs the same processing in steps p9 and p10 as in steps p4 and p5 to output the ignition signal s4. Then, in step p11, the process generates the preparatory cycle detection signal s7 in accordance with the voltage signal s6 following the leading reverse voltage portion e2 of the output voltage E.

Then, in step p12, the process detects the preparatory cycle detection voltage v4 or a preset peak value of the preparatory cycle detection signal s7. If the preparatory cycle detection voltage v4 has been detected, the process carries out the cycle measurement between adjacent preparatory cycle detection signals s7, i.e., the detection of RPMs. Then, in step p14, the detected result is compared with the ignition recovery speed z2 preset to the value of a speed slightly lower than the operation upper limit speed z1 to determine whether the RPM of the internal combustion engine has restored to the normal rotational speed range.

If the determination in step p14 shows "NO," the process returns to step p12 to detect an RPM again using the preparatory cycle detection signal s7. However, since the detection of the RPM using the preparatory cycle detection signal s7 is carried out with the ignition signal s4 being already output (in step p10), the internal combustion engine is in the misfire state while the RPM is being detected using the preparatory cycle detection signal s7.

If the determination in step p14 shows "YES," the process proceeds to step p8 to turn off the ignition signal s4, thereby returning to the normal ignition operation state.

In the first cycle after the process has returned from the misfire state to the normal ignition operation state, the process retrieves a pre-stored ignition timing signal corresponding to a conceivably suitable RPM, e.g., the ignition recovery speed z2 in accordance with a flag indicative of the first cycle after the restoration. The process then outputs the ignition signal s4 in accordance with the ignition timing signal; however, the process carries out the normal cycle measurement from the subsequent cycle for an ignition operation.

Figure 11:
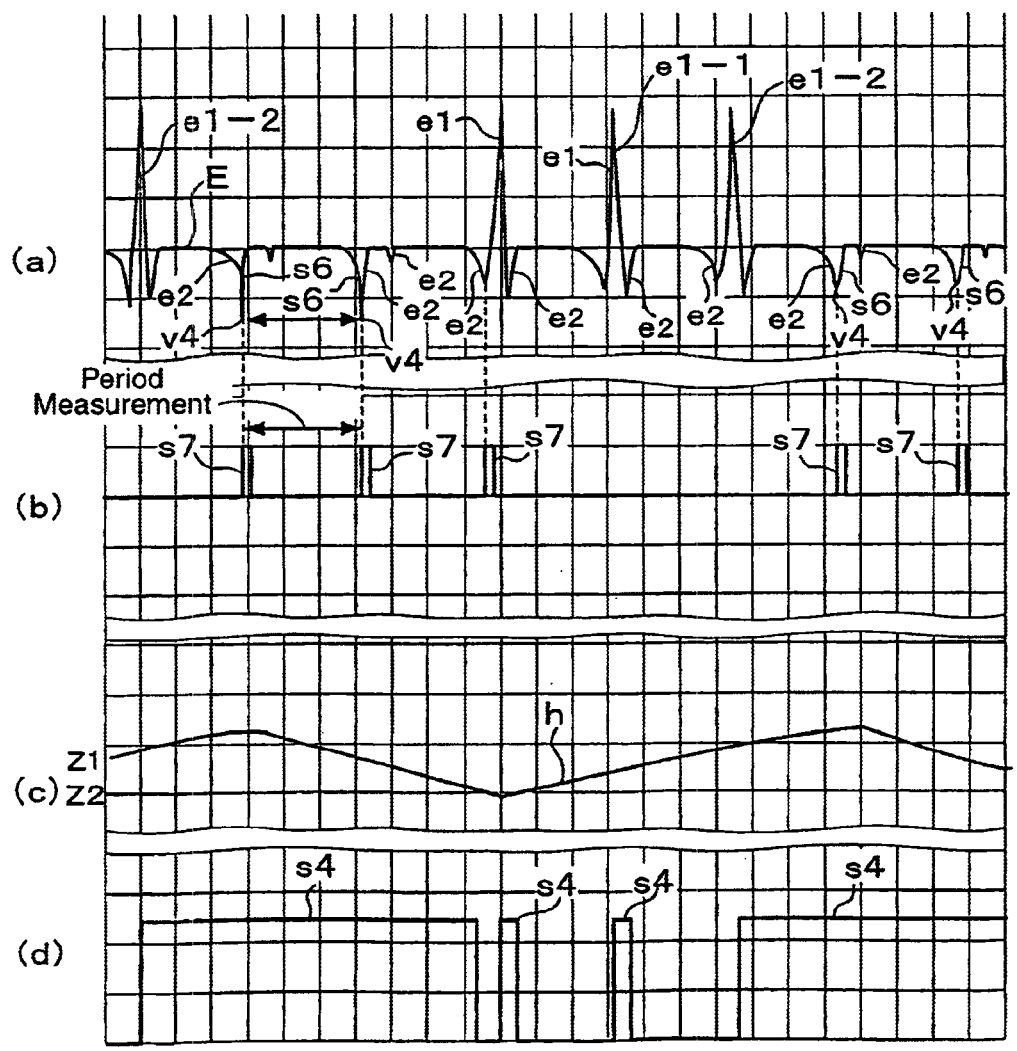
FIG. 11 is a performance diagram illustrating an example of the operation for preventing over-rotation according to the present invention.

FIG. 11 shows the operation states of the output voltage E, the preparatory cycle detection signal s7, the speed control characteristic, and the ignition signal s4 near the operation upper limit speed z1. As can be seen clearly from the output voltage waveform diagram shown in FIG. 11(a), the preparatory cycle detection signal waveform diagram shown in FIG. 11(b), and the ignition signal waveform diagram shown in FIG. 11(d), the process detects that the RPM is in the over-rotation state due to the occurrence of the forward voltage portion e1 of "e1-1" and then allows the ignition signal s4 output with respect to the occurrence of the forward voltage portion e1 of the next "e1-2" to remain output as well as the preparatory cycle detection signal s7 to be output.

Accordingly, the engine is determined to be in the misfire state for the first time in the cycle immediately after the cycle of the forward voltage portion e1 of "e1-2," the RPM starting to drop near this cycle in the misfire state. As shown in a speed control characteristic line h illustrated in FIG. 11(c), an RPM reduced to the ignition recovery speed z2 is detected through a duration measurement between the second and third preparatory cycle detection signals s7. The process immediately turns off the ignition signal s4 to restore the state to the normal ignition operation state and as well performs the first ignition operation after the restoration in accordance with a pre-stored ignition timing signal.

The diagram illustrated in FIG. 11 is obtained with the acceleration state of the internal combustion engine and the load coupled thereto being held unchanged for operation. Thus, the internal combustion engine is in a running condition for repeating deceleration and acceleration between the operation upper limit speed z1 and the ignition recovery speed z2. This allows for making use of the limiter effect of limiting the upper limit of the RPM of the internal combustion engine.

Since the operation upper limit speed z1 is set at a tolerable lower value than a critical speed at which the internal combustion engine and the load are operated in a critical condition, there is no danger even when the load is continually operated with increasing or decreasing RPMs between the ignition recovery speed z2 and the operation upper limit speed z1. However, since a decrease in the RPM due to a misfire can be readily and reliably detected, it is desirable to quickly release the accelerator or reduce the load when a misfire in the internal combustion engine is detected due to a decrease in RPM, thereby providing a load efficient operation condition.

Figure 12:
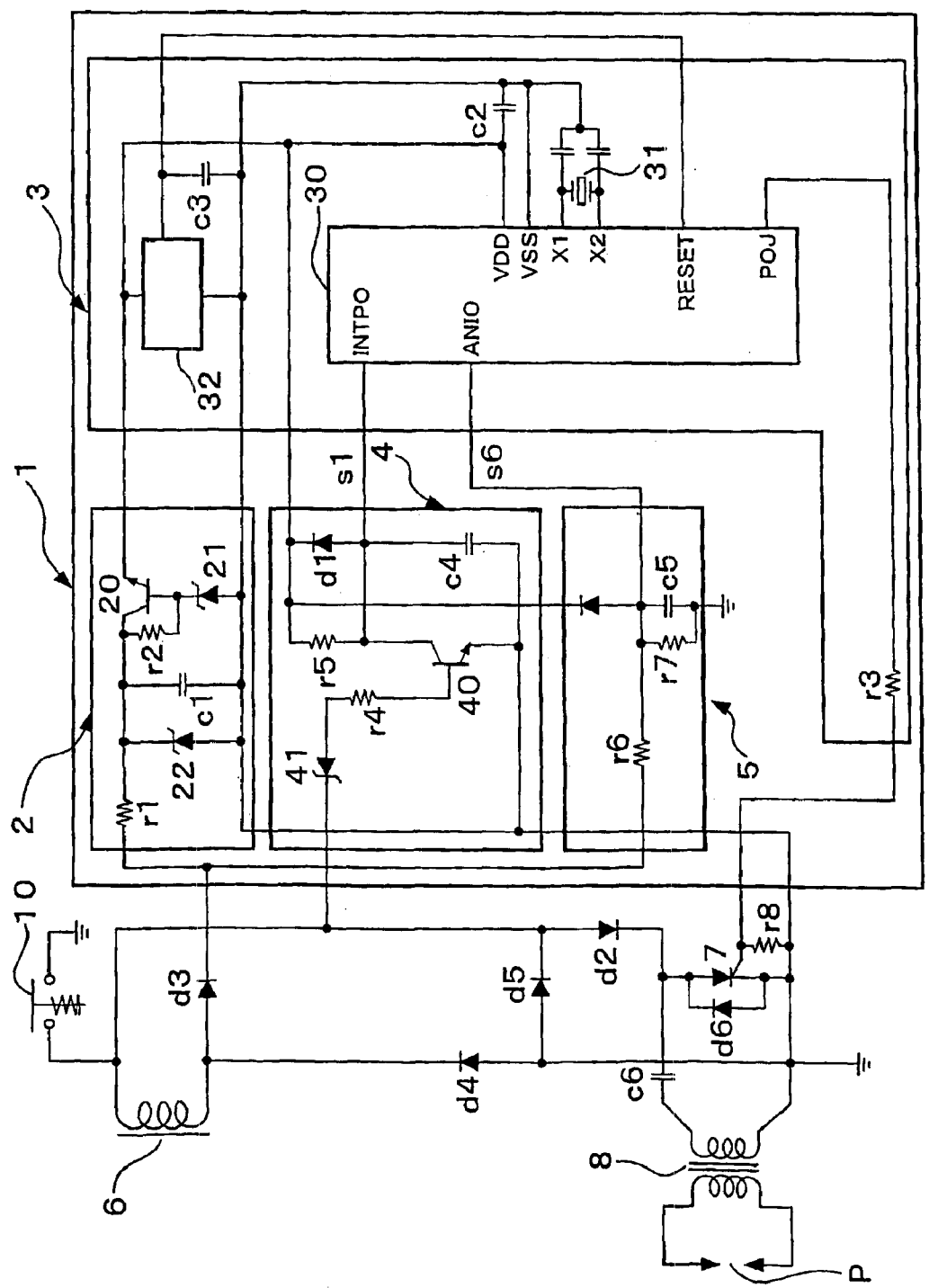
FIG. 12 is an electric circuit diagram illustrating an example of a circuit configuration of an ignition device for implementing the present invention.

FIG. 12 is a block circuit diagram illustrating a basic circuit configuration of the ignition timing control device 1, which is combined with a capacitive discharge ignition circuit incorporating a push-button stop switch 10 serving as a self-recovery normally open contact to constitute an ignition device for an internal combustion engine. The ignition timing control device 1 has the same configuration as that of the embodiment shown in FIG. 2 and provides the same operation.

The microcomputer 30 is provided with a stop counter for clearing a count of a stop time h1 in accordance with the cycle detection signal s1, the stop time h1 being preset as a time shorter than the ON time of the stop switch 10 or the short-circuit time h2 and longer than at least one cycle of the internal combustion engine at a time of short-circuiting provided by the stop switch 10, and for instructing to continually output the ignition signal s4 when the number of counts is greater than the stop time h1.

During the rotational operation of the internal combustion engine, the microcomputer 30 performs the following two interruptions in accordance with the cycle detection signal s1.

Figure 13:
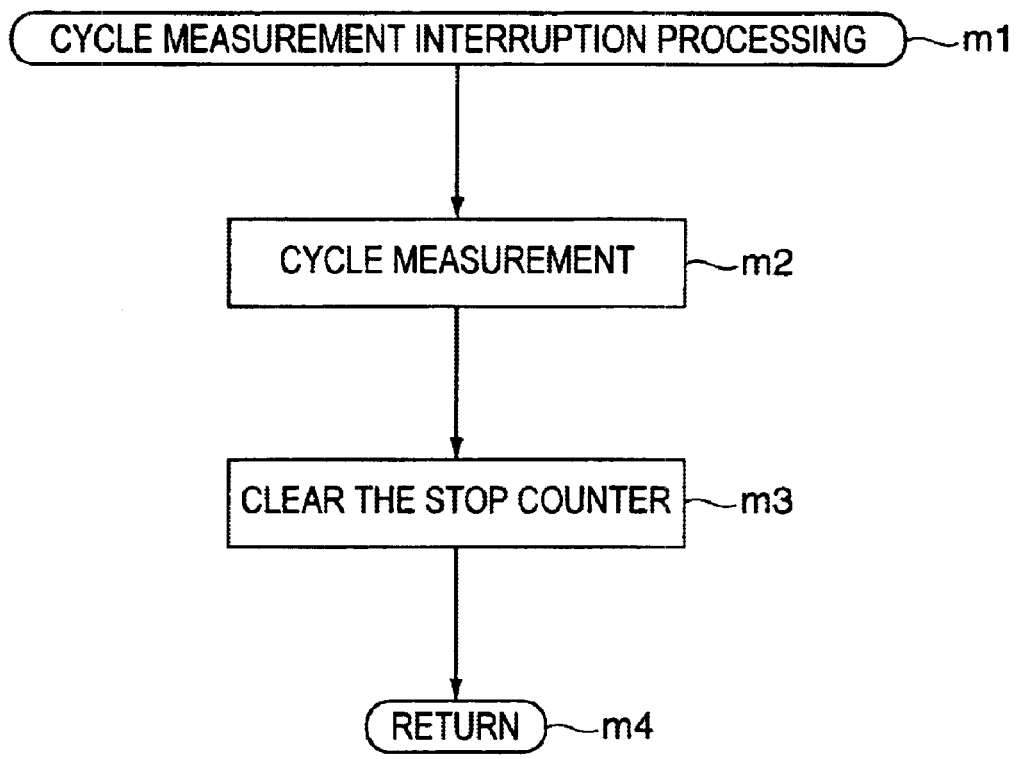
FIG. 13 is a flowchart illustrating an example of cycle measurement control according to the present invention.

For one of the interruptions being a cycle measurement interruption having its flowchart shown in FIG. 13, the process starts at step m1 and then performs the cycle measurement in step m2 to calculate an RPM. Then, in step m3, the process clears the stop counter, and then returns at step m4 to wait for the subsequently processed interruption command.

Figure 14:
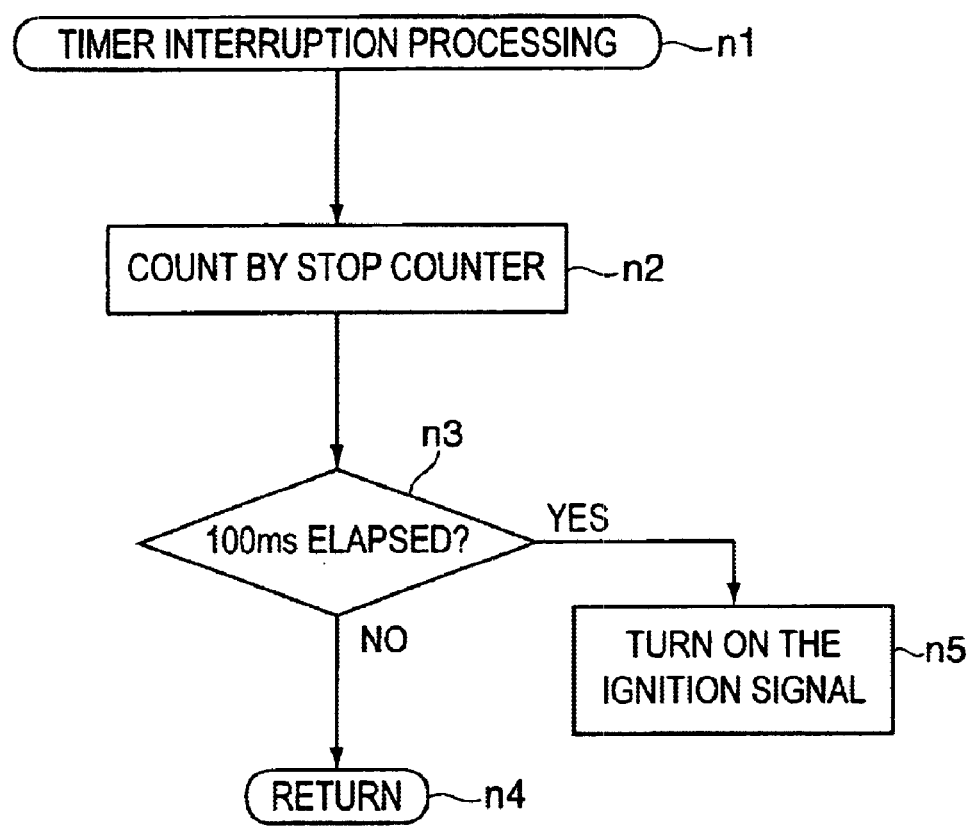
FIG. 14 is a flowchart illustrating an example of timer processing according to the present invention.

For the other interruption being a timer interruption having its flowchart shown in FIG. 14, this processing is set so as to cause an interruption every 1 ms, starting in step n1. Then, the process reads a count of the stop counter in step n2, and then determines whether the count read in step n3 has exceeded the preset stop time h1, for example, 100 msec.

If the count read has not yet exceeded the preset stop time h1, the process returns in step n4 to step n1 to wait for the subsequently processed interruption command. On the other hand, if the count read has exceeded the preset stop time h1, the process issues in step n5 a command for turning on the ignition signal s4.

Figure 15:
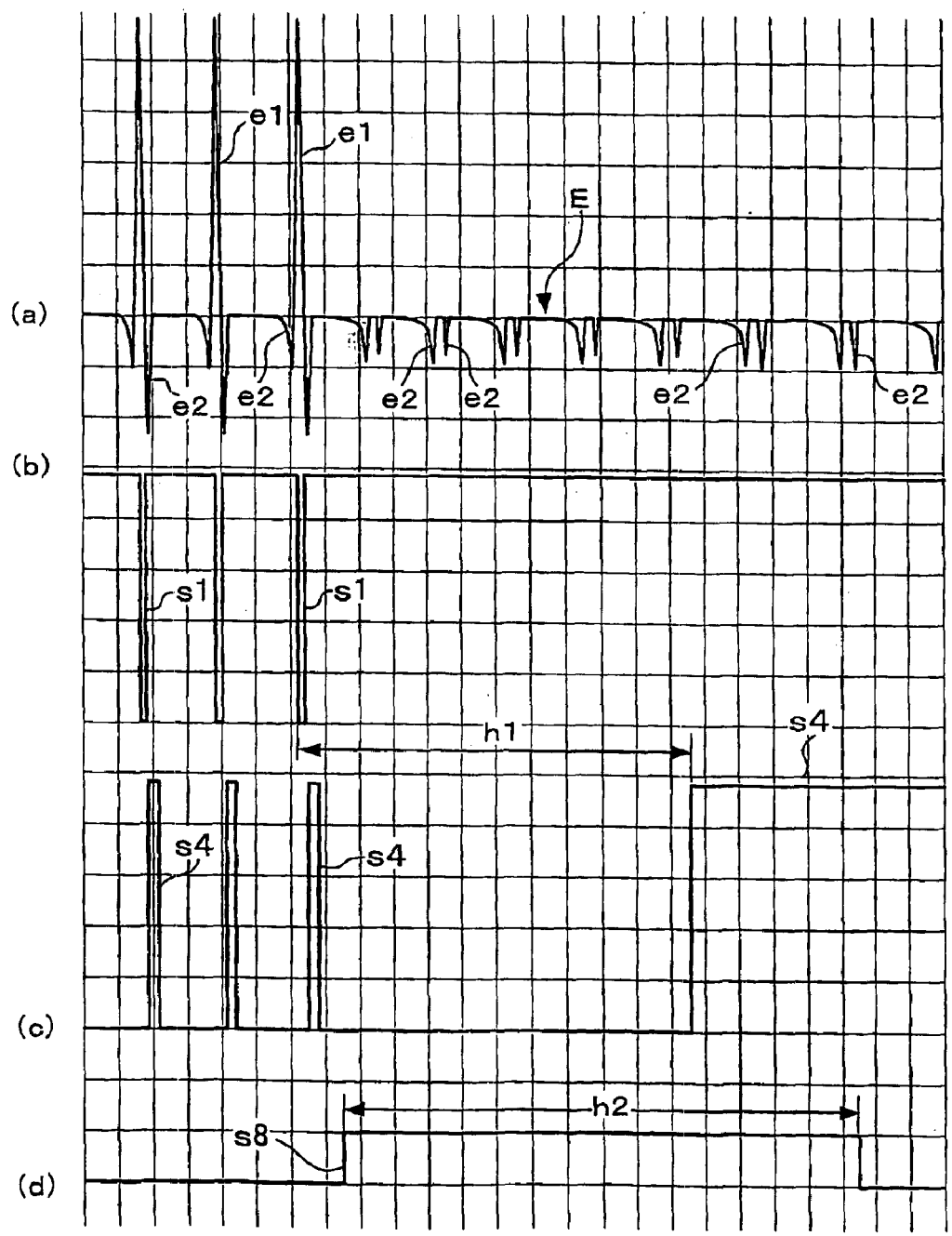
FIG. 15 is a performance diagram illustrating an example of a stop operation according to the present invention.

FIG. 15 shows the operation states of the output voltage E, the cycle detection signal s1, the ignition signal s4, and a short-circuiting signal s8 when an internal combustion engine is at a standstill. The cycle detection signal s1 is generated at the rising edge of the forward voltage portion e1 of the output voltage E. In the normal ignition operation state in which the ignition signal s4 is output after the occurrence of the cycle detection signal s1, the stop switch 10 is turned on causing the short-circuiting signal s8 shown in FIG. 15(d) to rise, without causing the forward voltage portion e1 to rise in a cycle after the short-circuiting signal s8 has risen, as shown in FIG. 15(a) Accordingly, as shown in FIGS. 15(b) and 15(c), the cycle detection signal s1 and the ignition signal s4 are not generated, thereby causing the ignition device to be in the misfire state and allowing the stop counter to continue counting the stop time h1.

The inertia of the internal combustion engine during operation causes this condition to continue for several cycles, while the stop counter counts up the stop time h1 set so as to be shorter than a short-circuit time h2 of the stop switch 10. This allows the ignition signal s4 to be continually output to cause the dischargeable switching element to be sustained in the conduction state and substantially short-circuit between the forward and reverse terminals of the generator coil 6, thereby disabling the ignition device to perform an ignition operation.

Therefore, after the short-circuit time h2 has elapsed, the ignition operation by the ignition device will never be re-started even when the stop switch 10 has restored to the OFF state, thereby causing the internal combustion engine to stop.

A stop of the internal combustion engine causes the ignition timing control device 1 to entirely restore to the stand-by state prior to the operation of the internal combustion engine, thus naturally causing the continual outputting of the ignition signal s4 to stop.

Figure 16:
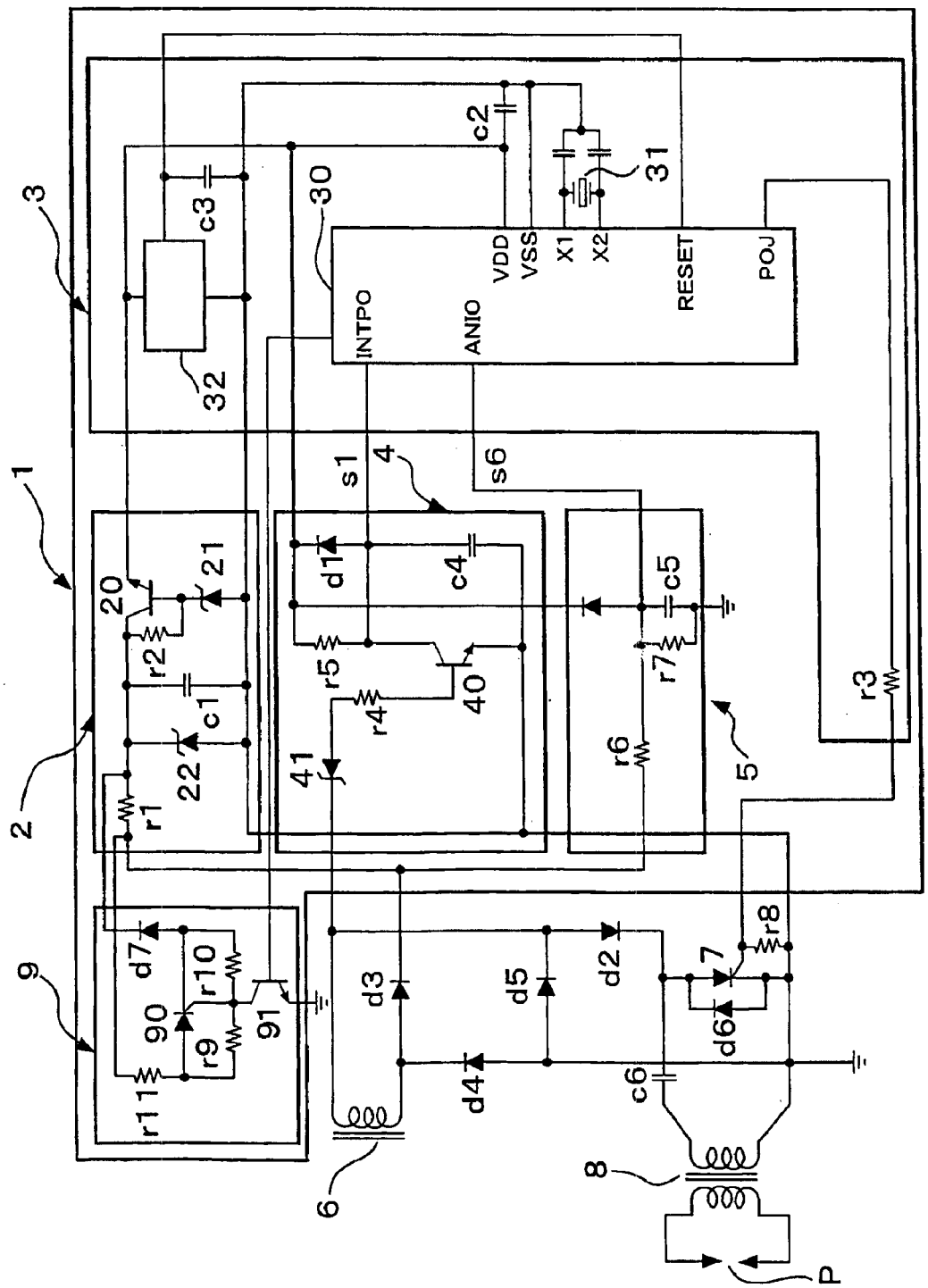
FIG. 16 is an electric circuit diagram illustrating an example of a circuit configuration of an ignition device for implementing the present invention.

FIG. 16 is an electric circuit diagram illustrating a circuit configuration of the ignition timing control device 1 incorporating a quick-recharging portion 9, which is combined with a capacitive discharge ignition circuit to constitute an ignition device for an internal combustion engine. The ignition timing control device 1 includes the constant voltage power supply portion 2 incorporating the quick-recharging portion 9, the microcomputer portion 3, the cycle signal generation portion 4, and the voltage detection portion 5. The constant voltage power supply portion 2, the microcomputer portion 3, the cycle signal generation portion 4, and the voltage detection portion 5 have the same configurations as those shown in FIG. 2 and provide the same operations.

The quick-recharging portion 9, connected in parallel to the current limiting resistor r1 of the constant voltage power supply portion 2, comprises a series circuit including a protective resistor r11, a rechargeable switching element 90 having a bias resistor r9 connected between the anode and gate of a thyristor and a gate stabilizing resistor r10 connected between the gate and the cathode, and a rectifying diode d7, which are connected in parallel to the current limiting resistor r1, and a turn-off transistor 91 connected between the gate of the rechargeable switching element 90 and the ground.

The protective resistor r11 prevents the reverse voltage portion e2 of the output voltage E from acting as a surge voltage on the rechargeable switching element 90 of the quick-recharging portion 9, the power supply capacitor c1 of the constant voltage power supply portion 2, and a voltage stabilizing transistor 20. The protective resistor r11 is preferably approximately 10 ohms for the current limiting resistor r1 being 2 kohms.

On the other hand, the rectifying diode d7 prevents the recharge charges of the power supply capacitor c1 from being discharged through the turn-off transistor 91 with the turn-off transistor 91 being in the turned on state. The rectifying diode d7 can be eliminated when a rectifying diode is provided between the current limiting resistor r1 and the power supply capacitor c1.

The turn-off transistor 91 is turned on in response to a trigger signal received by its base from the microcomputer portion 3, holding its state until the trigger signal is supplied no longer.

Rotating the internal combustion engine by pulling the recoil starter causes the output voltage E to be induced in the generator coil 6. The forward voltage portion e1 of the output voltage E is recharged to the rechargeable capacitor c6, while most of the reverse voltage portion e2 is recharged to the power supply capacitor c1 of the constant voltage power supply portion 2 through the quick-recharging portion 9.

Figure 17:
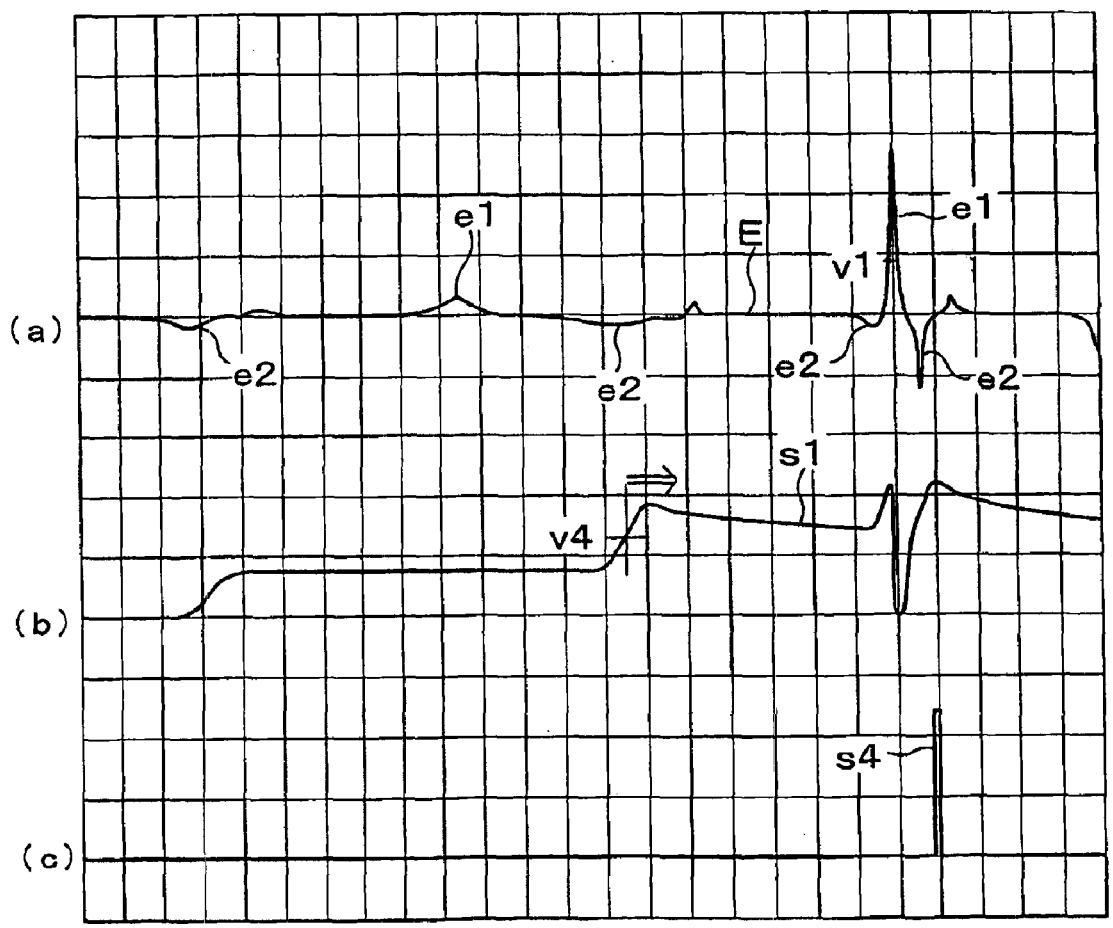
FIG. 17 is an actually measured performance diagram illustrating an example of the operation performed upon start-up according to the present invention.

The actually measured performance diagram shown in FIG. 17 illustrates an example in which the recoil starter provides a badly initiated first rotation. As can be seen clearly from the performance diagram of the output voltage E in FIG. 17(a), although both the reverse voltage portions e2 are insufficiently raised, the cycle detection signal s1 shown in FIG. 17(b) slightly less than but varying generally in the same manner as the recharge voltage of the constant voltage power supply portion 2 shows that the recharge voltage of the constant voltage power supply portion 2 has reached the microcomputer start-up voltage v4 (or a reset release voltage normally being 2.2 v) because of the recharging with the delayed reverse voltage portion e2 provided by the first rotation of the internal combustion engine.

The reset IC 32 detects the voltage output by the constant voltage power supply portion 2 reaching the microcomputer start-up voltage v4, thereby allowing the microcomputer 30 to be released from its reset state and started. Thus, the microcomputer 30 is initialized and then placed into a stand-by state (power saving mode).

In this condition, the second rotation of the internal combustion engine with the recoil starter allows the forward voltage portion e1 of the output voltage E raised up to the cycle detection voltage v1 for low rising edge of the cycle detection signal s1, which is then input to the microcomputer 30.

When the first cycle detection signal s1 is input (see FIG. 3 for the descriptions below), the process detects the preset start-up voltage v3 from the voltage signal s6 input immediately thereafter in accordance with the cycle detection signal s1, to generate the start-up voltage detection signal s3. Following the occurrence of the start-up voltage detection signal s3, the process immediately outputs the ignition signal s4 (see FIG. 17(c)) to the dischargeable switching element 7 of the ignition circuit for an ignition operation, thus reliably starting the internal combustion engine with safety.

Figure 18:
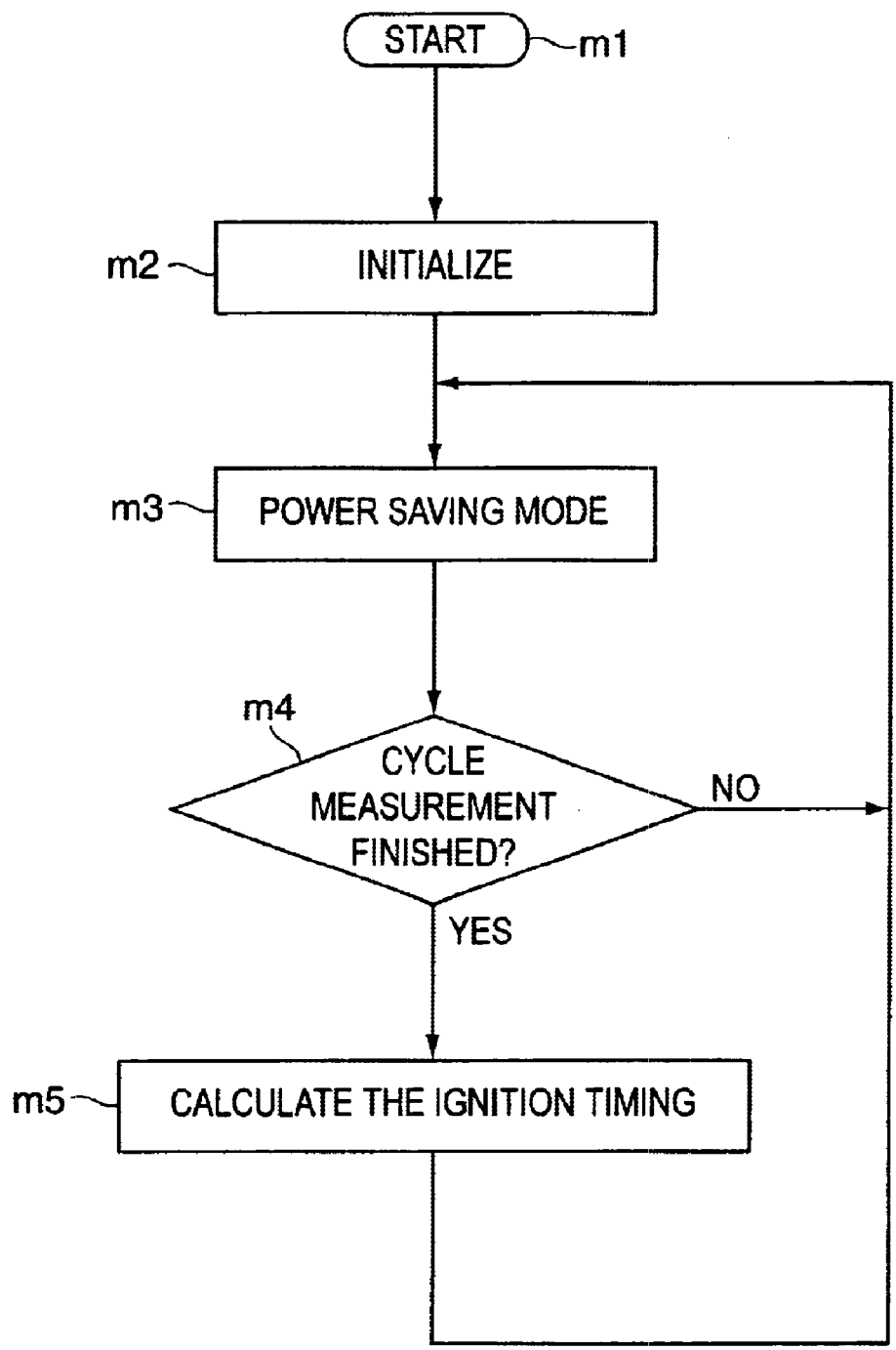
FIG. 18 is a flowchart illustrating the main routine for an ignition device for implementing the present invention.

Upon starting the internal combustion engine, the microcomputer 30 performs the processing shown in the main routine, the flowchart of which is illustrated in FIG. 18. That is, the process releases the reset and starts in step m1, and then completes the initialization in step m2, followed by the stand-by state in step m3.

Figure 19:
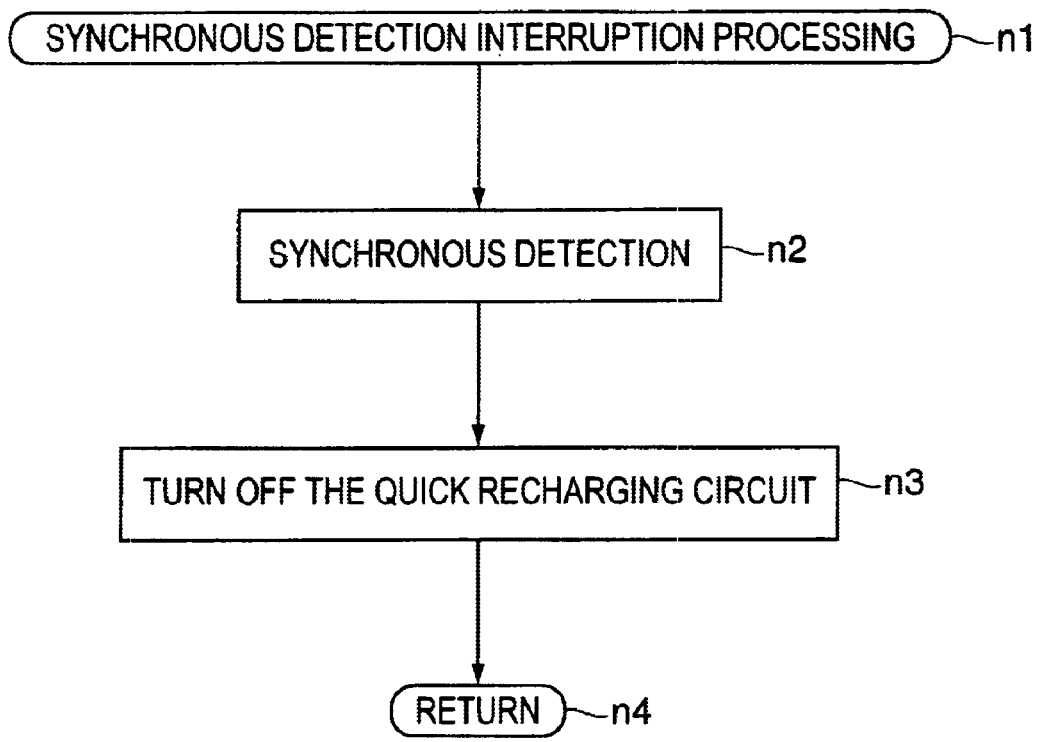
FIG. 19 is a flowchart illustrating an interruption in an ignition device for implementing the present invention.

In this condition, the first cycle detection signal s1 is input. Then, the process starts in step n1 the cycle detection interruption, the flowchart of which is illustrated in FIG. 19. Then, the process checks the entry of the cycle detection signal s1 in step n2, and thereafter turns off the quick-recharging portion 9 in step n3. That is, the process provides a trigger signal to the turn-off transistor 91 to place the rechargeable switching element 90 in the non-conducting state, allowing the current limiting resistor r1 to make use of its operation. Then, the process returns to point "a" in the main routine in step n4.

In step m4 of the main routine, the process determines whether the cycle measurement has been carried out in accordance with the cycle detection signal s1 input. Since the cycle measurement cannot be made on the first cycle detection signal s1, the process returns straight to step m3. However, since the cycle measurement is conducted on the second cycle detection signal s1 and the subsequent signals, the process proceeds to step m5 to calculate the ignition timing, and then returns to step m3.

For the constant voltage power supply portion 2 incorporating no quick-recharging portion 9, the first rotation of the internal combustion engine with the recoil starter will cause the reverse voltage portion e2 to be generated in the output voltage E as shown in FIG. 20(a). However, as shown in FIG. 20(b), the limiting action of the current limiting resistor r1 limits the voltage of the cycle detection signal s1 down at a low level, thereby never allowing the voltage to reach the microcomputer start-up voltage v4.

In this condition, the second rotation of the internal combustion engine with the recoil starter allows the leading reverse voltage portion e2 of the output voltage E to raise the voltage of the cycle detection signal s1, but never allows the voltage to reach the microcomputer start-up voltage v4. Since the voltage reaches the microcomputer start-up voltage v4 only by the delayed reverse voltage portion e2, the ignition signal s4 is output for the first time when the internal combustion engine provides the third rotation with the recoil starter, as shown in FIG. 20(c).

Figure 20:
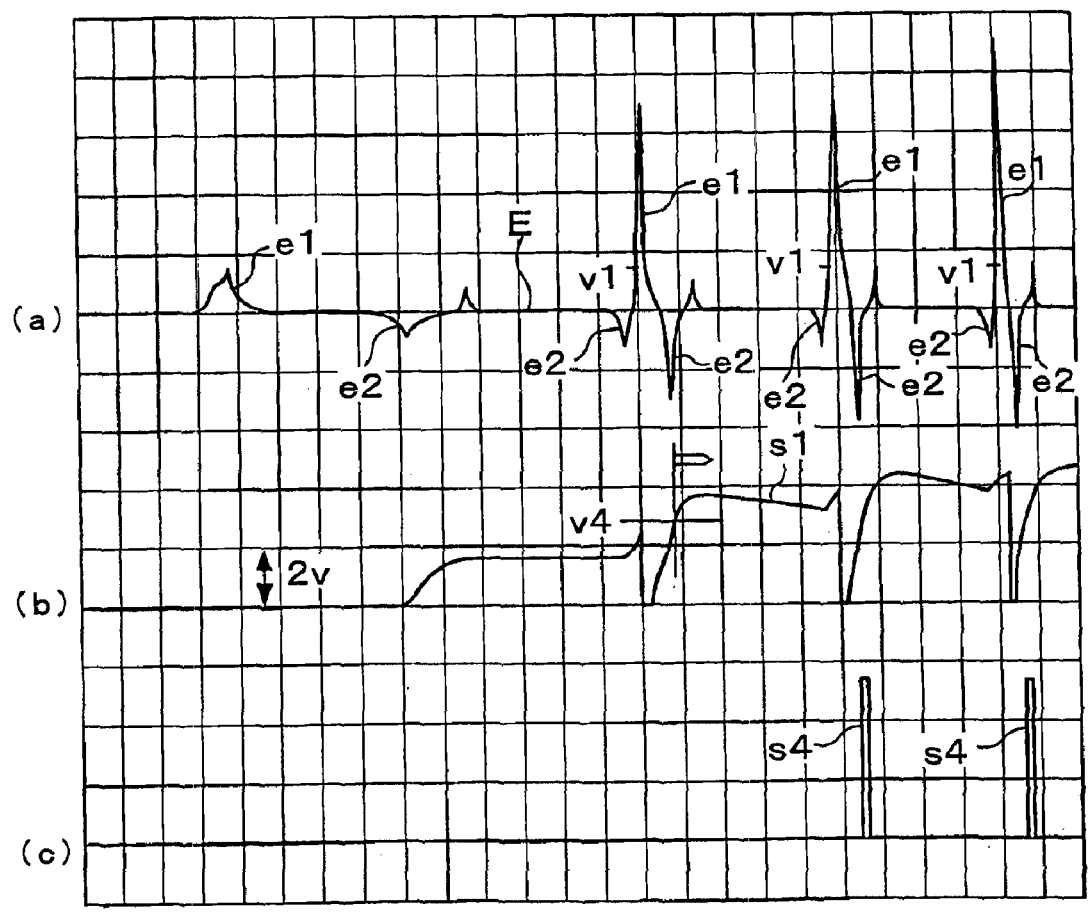
FIG. 20 is an actually measured performance diagram illustrating an example of the operation performed upon start-up, without a quick recharging portion.

As described above, in the absence of the quick-recharging portion 9, the limiting action of the current limiting resistor r1 in the constant voltage power supply portion 2 limits the recharge voltage of the constant voltage power supply portion 2 to a low rising edge. Thus, as shown in FIG. 20, even when the recoil starter provides a relatively good initiation, the recoil starter must rotate the internal combustion engine three times or more.

Effects of the Invention

The present invention is configured as described above, providing the following effects.

The invention as set forth in claim 1 is adapted to obtain the cycle detection signal, the peak voltage detection signal, and the start-up voltage detection signal from the output voltage from the generator coil. The ignition signal is output in accordance with an ignition timing signal provided by the cycle detection signal, the peak voltage detection signal, or the start-up voltage detection signal, thus eliminating the need for a dedicated pulser coil for obtaining an ignition signal or each timing signal. This simplifies the structure of the magneto generator incorporated into an internal combustion engine, thereby making it possible to provide an ignition device reduced in size and weight.

In the speed region of the stand-by speed or less including an idling speed, the ignition signal is output immediately after the peak detection point in time that is set at the ignition position for providing improved fuel consumption. This allows the internal combustion engine to operate in a stand-by state with reduced fuel consumption, thereby making it possible to obtain an economically improved running condition.

In the speed region of the stand-by speed or more, the ignition signal is output according to an ignition period determined in accordance with each RPM from the ignition timing calculation start point in time that is preset corresponding to the most desirable position for ignition. This allows the ignition operation to be carried out at an advance level that is most suitable for each RPM, thereby providing sufficiently improved output from the internal combustion engine to efficiently operate the coupled load in an unforced manner.

Furthermore, at the time of start-up, the ignition operation is performed at a start-up point in time very close to the top dead center of the internal combustion engine under the condition in which the RPM of the internal combustion engine has reached the speed that enables the generator coil to generate an output voltage allowing for continual ignition operations. This allows the internal combustion engine to reliably start with safety without any kickback.

In the invention as set forth in claim 2, the level of advancement of the ignition timing can be properly set in accordance with the RPM in the running speed region for operating a load between the standby speed and an operation speed, thereby making it possible to provide an increase or a decrease in output as required and an efficient load operation condition.

In the invention as set forth in claim 3, the ignition timing calculated in the previous cycle is used as the ignition timing for the current cycle, thereby allowing ignition operations to continue without significantly missing the ignition timing. Moreover, since the RPM is restricted in this high-speed region, the internal combustion engine can be safely operated.

The invention as set forth in claim 4 can provide a safe ignition operation in a speed region of a lower limit speed or less in which a rotational operation of the internal combustion engine is unstable. This makes it possible to reliably sustain the rotational operation of the internal combustion engine with safety.

The invention as set forth in claim 5 provides a stable idling operation with reduced fuel consumption to the internal combustion engine, thereby making it possible to provide an economical stand-by state with safety.

The invention as set forth in claim 6 eliminates the need for a pulser coil or a coil for outputting the ignition signal or detecting an RPM, thereby simplifying the structure of the magneto generator. In addition, since no battery is required, the entire internal combustion engine can be reduced in size, weight, and cost.

Furthermore, the cycle detection signal obtained by the forward voltage of the output voltage from the generator coil and the voltage signal obtained by the reverse voltage of the same output voltage are obtained separately at the respectively dedicated cycle signal generation portion and voltage detection portion. This allows for simplifying the circuit configurations and as well reliably providing both the signals with stability at high accuracy.

Furthermore, it is possible to provide a stand-by state with reduced fuel consumption, a load efficient operation, and a reliable start-up with safety.

The invention as set forth in claim 7 makes it possible to almost completely eliminate an adverse effect of a surge noise on the microcomputer. Thus, a stable operation of the microcomputer can be obtained and all the ignition signals are output from the microcomputer. This allows the internal combustion engine to start after the microcomputer has been started, thereby providing a very good start-up characteristic to the internal combustion engine.

In the invention as set forth in claim 8, at the time of start-up, the internal combustion engine is started when a start-up voltage is detected at a slightly advanced position or a hardly advanced position with respect to the top dead center of the internal combustion area and outside a kickback area under the condition in which the RPM of the internal combustion engine has reached the speed that enables the generator coil to generate an output voltage allowing for continual ignition operations. This allows the internal combustion engine to reliably start with safety.

In the low speed region, including the time of start-up, of the lower limit speed or less, which tends to be unstable in the rotational operation state of the engine, the ignition signal is output at the position (the rotation angle position) at which the value of the delayed reverse voltage portion at the time of the calculated RPM is coincident with any of each constant voltage characteristic line within a tolerance range. Accordingly, the ignition operation is performed when the value of the voltage signal has reached a target value, without being affected by the instability in the rotational operation of the internal combustion engine in the low speed region, thereby providing a stabilized ignition operation without causing an abnormally significant advancement.

Furthermore, since the ignition timing in the low speed region, though in the sawtooth form, advances along the setting advancement angle characteristic line with increasing RPMs, the advancing operation in the low speed region can be reliably obtained. This makes it possible to immediately transfer from the low speed region in which the engine provides an unstable rotational operation to the speed region of the lower limit speed or more in which the engine provides a stable rotational operation, thus providing a stable running condition to the engine.

The invention as set forth in claim 9 employs a misfire or stops the ignition operation to reduce the RPM of the internal combustion engine to prevent the occurrence of over-rotation, thereby ensuring the over-rotation prevention effect. Moreover, since the aforementioned misfire is obtained with the rechargeable capacitor not being recharged, no possibility of causing an undesirable ignition operation is provided, thereby making it possible to provide a safe over-rotation prevention effect.

Furthermore, even in the misfire state of the ignition device, the RPM is detected in accordance with the leading reverse voltage portion of the output voltage that is not affected by the armature reaction of the forward voltage portion of the output voltage. Thus, like in the normal ignition operation state, the RPM can be always reliably detected with accuracy, thereby making it possible to accurately know in real time the level of a decrease in the RPM due to a misfire. It is thus possible to obtain a good over-rotation prevention operation which employs a misfire for an immediate deceleration to the target rotational speed region and immediately restores the normal rotational operation state once the deceleration to the target rotational speed region is achieved.

The invention as set forth in claim 10 provides an adequate hysteresis for restoring from the misfire state to the normal ignition operation state, thereby making it possible to provide a smooth variation in RPM involved in the switching between the normal ignition operation state and the misfire state.

The invention as set forth in claim 11 makes it possible to provide a significantly simplified structure to the circuit means for detecting the preparatory cycle detection voltage and reliably detect the preparatory cycle detection voltage. This makes it possible to reliably detect with safety the RPM of the internal combustion engine in the misfire state.

The invention as set forth in claim 12 only requires the signal processing in the ignition timing control device except for the means for short-circuiting between the forward terminal of the generator coil and the ground. Unlike the case of providing a dedicated stop circuit, time-consuming works such as the setting of proper circuit constants such as the impedance to the main ignition control circuit, the rating setting for each of the components constituting the circuit, and the connection and attachment to the ignition control circuit are not required at all. A simple signal processing setting can reliably provide a safe stop operation.

The invention is also adapted to stop the internal combustion engine by directly short-circuiting between the forward terminal of the generator coil and the ground. Accordingly, even when the ignition timing control device fails, the short-circuiting state can be sustained between the forward terminal of the fuel consumption and the ground, thereby ensuring the internal combustion engine to stop. This allows for reliably bringing about a high-level fail-safe effect.

In the invention as set forth in claim 13, even when a misfire resulting from a noise or surge occurs, a signal accompanying the misfire resulting from the surge is never taken for a stop signal, thereby allowing the internal combustion engine to operate safely without abnormally stopping it.

The invention as set forth in claim 14 only requires a stop switch as a dedicated component with only the other procedure for setting a program in the microcomputer of the ignition timing control device. Thus, the invention provides a very simplified structure and can reduce costs required for the components and manufacture, thus being reduced in cost in its implementation.

Furthermore, since the cycle detection signal is used as a clearing signal for the stop counter, the counting by the stop counter is carried out from the beginning of each cycle. For this reason, the stop switch can be turned on at any time to provide the counting operation of the stop time with accuracy, thereby making it possible to obtain a stable stop operation.

The invention as set forth in claim 15 reliably prevents the occurrence of a problem of the internal combustion engine being disabled to stop, which results from the short-circuit time being shorter than the stop time, thereby reliably providing a stop operation with stability. Furthermore, even when a misfire occurs resulting from a noise surge, the misfire resulting from a surge will never be taken for a misfire provided by the stop switch being turned on, thereby making it possible to provide a safe stop operation without being abnormally stopped.

The invention as set forth in claim 16 allows the reverse voltage portion of the output voltage to be recharged to the constant voltage power supply portion almost directly without being limited by the current limiting resistor, thus allowing the recharge voltage of the constant voltage power supply portion to be quickly raised. This allows the microcomputer to be started at a very early stage, thereby making it possible to reliably start an ignition operation earlier without any problem.

The quick recharging of the reverse voltage portion of the output voltage to the constant voltage power supply portion can be achieved only by bypassing the current limiting resistor, thus being readily achieved with simple processing with safety and stability.

In the invention as set forth in claim 17, the bypass path of the current limiting resistor in the constant voltage power supply portion can be formed at the same time as the rising edge of the reverse voltage portion of the output voltage. This allows the recharge voltage of the constant voltage power supply portion to reach very quickly the microcomputer start-up voltage, leading to an earlier starting of the microcomputer.

In the invention as set forth in claim 18, a decrease in the output voltage from the generator coil can be prevented to provide a reliable ignition operation. Furthermore, the invention prevents an error from occurring in ignition timing due to a distortion in the output voltage waveform, thereby making it possible to provide a stabilized ignition operation.

The invention as set forth in claim 19 allows the rechargeable switching element in the quick recharging portion to immediately conduct by the reverse voltage portion of the output voltage. Thus, most of the reverse voltage portion generated can be recharged to the constant voltage power supply portion as it is, thereby achieving a quick recharging of the constant voltage power supply portion.

The turn-off transistor is turned on in response to the trigger signal from the microcomputer portion to stop the quick recharging operation of the quick recharging portion. This allows the microcomputer portion to freely provide control to stop the quick recharging operation of the quick recharging portion, thereby allowing the start-up performance of the internal combustion engine not to be affected by the quick recharging of the constant voltage power supply portion.

Furthermore, the quick recharging portion basically includes the rechargeable switching element for being self-triggered in accordance with the reverse voltage portion of the output voltage, and the turn-off transistor for placing the rechargeable switching element in a non-conducting state in response to the trigger signal from the microcomputer portion. This makes it possible to provide a very simple configuration and reduce the cost for implementation.

The invention as set forth in claim 20 is adapted to prevent the problem in that, without a rectifying diode capable of blocking backflow between the voltage recharge portion of the constant voltage power supply portion and the current limiting resistor, placing the rechargeable switching element in a non-conducting state will cause the recharging charge from the voltage recharge portion of the constant voltage power supply portion to be discharged through the turn-off transistor. This ensures a stable operation of the constant voltage power supply portion.

The invention as set forth in claim 21 safely protects the rechargeable switching element and the electronic components in the constant voltage power supply portion from the reverse voltage portion of the output voltage, thus providing enhanced safety to the constant voltage power supply portion.

In the invention as set forth in claim 22, the thyristor is self-triggered in accordance with the reverse voltage portion of the output voltage, thereby being ensured to conduct in response to the rising edge of the reverse voltage portion. This ensures the quick recharging of the reverse voltage portion of the constant voltage power supply portion to be achieved at once.

FIG. 10
P1 Start
P2 Normal cycle measurement
P3 Over-rotation?
P4 Calculate the ignition timing signal.
P5 Output the ignition signal.
P6 Set the ignition signal OFF timer.
P7 Time elapsed?
P8 Turn off the ignition signal.
P9 Calculate the ignition timing signal.
P10 Output the ignition signal.
P11 Start A/D conversion.
P12 Peak detected?
P13 Peak-to-peak cycle measurement
P14 Normal rotation?

FIG. 11
Period Measurement

FIG. 13
m1 Cycle measurement interruption processing
m2 Cycle measurement
m3 Clear the stop counter.
m4 Return FIG. 14
n1 Timer interruption processing
n2 Count by stop counter.
n3 100 ms elapsed?
n4 Turn on the ignition signal.

FIG. 18
m1 Start
m2 Initialize
m3 Power saving mode
m4 Cycle measurement finished?
m5 Calculate the ignition timing.

FIG. 19
n1 Synchronous detection interruption processing
n2 Synchronous detection
n3 Turn off the quick recharging circuit.
n4 Return

What is claimed is:

1. A method for controlling, during a low speed, ignition timing of an ignition device for a capacitive discharge internal combustion engine, the ignition device including an ignition coil having an ignition plug connected to a secondary side, a generator coil in a high-voltage magneto generator driven by the internal combustion engine, a rechargeable capacitor provided on a primary side of said ignition coil and recharged by a forward voltage portion of an output voltage from said generator coil, and a dischargeable switching element for discharging electric charges of said rechargeable capacitor to a primary coil of said ignition coil by conduction, said method comprising the steps of:

generating a cycle detection signal at an ignition timing calculation start point in time, at which said forward voltage portion has reached a preset cycle detection voltage as a voltage making continual ignition operations available, to calculate an RPM in accordance with the cycle detection signal, generating a peak voltage detection signal at a peak detection point in time at which a delayed reverse voltage portion of said output voltage has reached a peak voltage, and generating a start-up voltage detection signal at a start-up point in time at which said delayed reverse voltage portion has reached a start-up voltage, the start-up voltage being set to a value which allows for staying as close as possible to the top dead center of the internal combustion engine outside a kickback area and for being reliably detected after said peak detection point in time with said cycle detection signal having been output, in a low speed region of a lower limit speed or less or a lower limit of a speed region in which the engine rotates with stability, dividing the delayed reverse voltage portion at a time of the lower limit speed with respect to said start-up voltage at a division ratio determined by a preset advancement angle characteristic line and a tolerance range setting to obtain a constant voltage characteristic line indicative of angle/speed characteristics with each divided value being made constant in order to output an ignition signal to the dischargeable switching element at a point in time at which a value of said delayed reverse voltage portion matches a value on the constant voltage characteristic line within the tolerance range, and outputting the ignition signal to the dischargeable switching element at said start-up point in time at the time of a start-up.

2. An ignition timing control device for calculating RPMs of an internal combustion engine and for outputting an ignition signal or a trigger signal to a dischargeable switching element in accordance with an ignition timing signal or a temporal signal for said RPMs or each of said RPMs, said ignition timing control device being incorporated into an ignition device for a capacitive discharge internal combustion engine, said ignition device including an ignition coil having an ignition plug connected to a secondary side, a generator coil in a high-voltage magneto generator driven by the internal combustion engine, a rechargeable capacitor provided on a primary side of said ignition coil and recharged by a forward voltage portion of an output voltage from said generator coil, and a dischargeable switching element for discharging electric charges of said rechargeable capacitor to a primary coil of said ignition coil by conduction, said ignition timing control device comprising a constant voltage power supply portion, a microcomputer portion, a cycle signal generation portion, and a voltage detection portion, wherein said constant voltage power supply portion recharges a reverse voltage portion of the output voltage from said generator coil and supplies a constant voltage output to said microcomputer portion, said cycle signal generation portion, and said voltage detection portion, said cycle signal generation portion generates a cycle detection signal at an ignition timing calculation start point in time at which the forward voltage portion of the output voltage from said generator coil has reached a preset cycle detection voltage as a voltage making continual ignition operations available, said voltage detection portion outputs the delayed reverse voltage portion of the output voltage from said generator coil as a voltage signal, and said microcomputer portion
calculates an RPM using a time between the ignition timing calculation start point in time or an input point in time of an input cycle detection signal to the subsequent ignition timing calculation start point in time to prepare an ignition timing calculation signal for determining an ignition timing signal or a temporal signal corresponding to said RPM so as to generate a peak voltage detection signal at a peak detection point in time at which said delayed reverse voltage portion has reached a peak voltage in accordance with said input of voltage signal and generates a start-up voltage detection signal at a start-up point in time at which said voltage signal has reached a start-up voltage the start-up voltage being set to a value which allows for staying as close as possible to the top dead center of the internal combustion engine and for being reliably detected after said peak detection point in time with said cycle detection signal having been output, outputs an ignition signal to the dischargeable switching element after a duration of the ignition timing signal obtained by said ignition timing calculation signal from said peak detection point in time at a standby speed setting or less, outputs the ignition signal to the dischargeable switching element after a duration of said ignition timing calculation signal from said ignition timing calculation start point in time at said standby speed or more, and outputs the ignition signal to the dischargeable switching element at said start-up point in time at the time of a start-up.

3. The ignition timing control device for an internal combustion engine according to claim 2, wherein said microcomputer portion has a microcomputer incorporating a reset IC, and a constant voltage output from the constant voltage power supply portion is set to a value close to an upper limit value of an operable voltage of said microcomputer and said constant voltage power supply portion outputs a constant voltage output, thereby canceling a reset to the microcomputer by said reset IC.

4. A method for controlling ignition timing of an ignition device for a capacitive discharge internal combustion engine, said ignition device having an ignition timing control device incorporated into an ignition circuit for the internal combustion engine, said ignition circuit including an ignition coil having an ignition plug connected to a secondary side, a generator coil in a high-voltage magneto generator driven by the internal combustion engine, a rechargeable capacitor provided on a primary side of said ignition coil and recharged by a forward voltage portion of an output voltage from said generator coil, and a dischargeable switching element for discharging electric charges of said rechargeable capacitor to a primary coil of said ignition coil by conduction provided by an ignition signal being input, said ignition timing control device generating a cycle detection signal at an ignition timing calculation start point in time at which said forward voltage portion has reached a preset cycle detection voltage as a voltage making continual ignition operations available to detect an RPM of the internal combustion engine in accordance with a time between adjacent cycle detection signals and output said ignition signal to the dischargeable switching element as required, said method comprising the steps of:

short-circuiting a forward terminal of said generator coil and a ground to disable the occurrence of said cycle detection signal, and continually outputting said ignition signal when a time from said cycle detection signal occurred most recently is longer than a preset stop time having been preset so as to be shorter than a short-circuit time between the forward terminal of said generator coil and the ground and longer than one cycle of the internal combustion engine at least during the short-circuiting.

5. The method for controlling ignition timing of an ignition device for an internal combustion engine according to claim 4, comprising the step of:

setting the stop time to a time slightly longer than three cycles of the internal combustion engine during the short-circuiting between the forward terminal of the generator coil and the ground.

6. An ignition timing control device for an ignition device for an internal combustion engine, said ignition device having an ignition timing control device incorporated into an ignition circuit for a capacitive discharge internal combustion engine, said ignition circuit including an ignition coil having an ignition plug connected to a secondary side, a generator coil in a high-voltage magneto generator driven by the internal combustion engine, a rechargeable capacitor provided on a primary side of said ignition coil and recharged by a forward voltage portion of an output voltage from said generator coil, and a dischargeable switching element for discharging electric charges of said rechargeable capacitor to a primary coil of said ignition coil by conduction provided by an ignition signal being input, said ignition timing control device calculating an RPM of the internal combustion engine and outputting an ignition signal (s4) or a trigger signal to a dischargeable switching element in accordance with an ignition timing signal or a temporal signal for said RPMs or each of said RPMs, said ignition timing control device comprising a constant voltage power supply portion, a microcomputer portion, and a cycle signal generation portion, said constant voltage power supply portion recharging a reverse voltage portion of an output voltage from said generator coil and supplying an output of a constant voltage to said microcomputer portion and said cycle signal generation portion, said cycle signal generation portion generating a cycle detection signal at an ignition timing calculation start point in time at which the forward voltage portion of the output voltage from said generator coil has reached a preset cycle detection voltage as a voltage making continual ignition operations available, said microcomputer portion calculating an RPM in accordance with a time from the ignition timing calculation start point in time or a point in time of input of the cycle detection signal input to a subsequent ignition timing calculation start point in time and outputting the ignition signal to the dischargeable switching element as required, said ignition timing control device comprising a stop switch, disposed between a forward terminal of said generator coil and a ground, serving as a self-reset normally open contact, and a stop counter for clearing a count of a stop time in accordance with said cycle detection signal, said stop time being preset in said microcomputer portion as a time shorter than a short-circuit time provided by said stop switch and longer than at least one cycle of the internal combustion engine at a time of short-circuiting, and for instructing to continually output said ignition signal when the number of counts is greater than the stop time.

7. The ignition timing control device for an ignition device for an internal combustion engine according to claim 6, wherein the stop time is set at approximately 100 msec.

8. A method for controlling an ignition timing of an ignition device for an internal combustion engine, said ignition device having an ignition timing control device incorporated into an ignition circuit for a capacitive discharge internal combustion engine, said ignition circuit including an ignition coil having an ignition plug connected to a secondary side, a generator coil in a high-voltage magneto generator driven by the internal combustion engine, a rechargeable capacitor provided on a primary side of said ignition coil and recharged by a forward voltage portion of an output voltage from said generator coil, and a dischargeable switching element for discharging electric charges of said rechargeable capacitor to a primary coil of said ignition coil by conduction provided by an ignition signal being input, said ignition timing control device comprising a microcomputer portion for receiving a cycle detection signal generated at an ignition timing calculation start point in time at which said forward voltage portion has reached a preset cycle detection voltage as a voltage making continual ignition operations available to detect an RPM of the internal combustion engine in accordance with a time between adjacent cycle detection signals and output said ignition signal to the dischargeable switching element as required, and a constant voltage power supply portion for partially restrictively recharging a reverse voltage portion of said output voltage with a current limiting resistor to operate said microcomputer portion by the recharged power, said method comprising the step of:

bypassing said current limiting resistor at the time of a start-up to allow most of the reverse voltage portion generated to be recharged to said constant voltage power supply portion, such that the recharge voltage from the constant voltage power supply portion is raised to a constant voltage range in which said microcomputer portion can be quickly operated.

9. The method for controlling an ignition timing of an ignition device for an internal combustion engine according to claim 8, comprising the step of allowing the reverse voltage portion of the output voltage to conduct a bypass path of the current limiting resistor.

10. A method for controlling ignition timing of an ignition device for a capacitive discharge internal combustion engine, said ignition device including an ignition coil having an ignition plug connected to a secondary side, a generator coil in a high-voltage magneto generator driven by the internal combustion engine, a rechargeable capacitor provided on a primary side of said ignition coil and recharged by a forward voltage portion of an output voltage from said generator coil, and a dischargeable switching element for discharging electric charges of said rechargeable capacitor to a primary coil of said ignition coil by conduction, said method comprising the steps of:

generating a cycle detection signal at an ignition timing calculation start point in time at which said forward voltage portion has reached a preset cycle detection voltages as a voltage making continual ignition operations available to calculate an RPM in accordance with the cycle detection signal and prepare an ignition timing calculation signal for determining an ignition timing signal or a temporal signal corresponding to said calculated RPM, generating a peak voltage detection signal at a peak detection point in time at which a delayed reverse voltage portion of said output voltage has reached a peak voltage, and generating a start-up voltage detection signal at a start-up point in time at which said delayed reverse voltage portion has reached a start-up voltage, the start-up voltage being set to a value which allows for staying as close as possible to the top dead center of the internal combustion engine and for being reliably detected after said peak detection point in time with said cycle detection signal having been output, outputting an ignition signal to the dischargeable switching element immediately after said peak detection point in time at a standby speed setting or less, outputting the ignition signal to the dischargeable switching element after a duration of the ignition timing signal obtained by the ignition timing calculation signal from said ignition timing calculation start point in time at said standby speed or more, and outputting the ignition signal to the dischargeable switching element at said start-up point in time at the time of a start-up.

11. The method for controlling ignition timing of an ignition device for an internal combustion engine according to claim 10, comprising the step of starting to count the ignition timing signal obtained by the ignition timing calculation signal at the ignition timing calculation start point in time in a running speed region between the standby speed setting and an operation speed higher than said standby speed.

12. The method for controlling ignition timing of an ignition device for an internal combustion engine according to claim 10, comprising the step of counting the ignition timing signal, obtained by the ignition timing calculation signal calculated at the previous ignition timing calculation start point in time, from the subsequent ignition timing calculation start point in time in a high speed region of the operation speed setting or more.

13. The method for controlling ignition timing of an ignition device for an internal combustion engine according to claim 10, comprising the step of counting the ignition timing signal, obtained by the ignition timing calculation signal calculated at the ignition timing calculation start point in time, immediately after the peak detection point in time occurring in the same cycle as said ignition timing calculation start point in time, in a speed region of a lower limit speed setting or less in which a rotational operation of the internal combustion engine is unstable.

14. The method for controlling ignition timing of an ignition device for an internal combustion engine according to claim 10, comprising the step of outputting the ignition signal to the dischargeable switching element immediately after the peak detection point in time, in a speed region between the lower limit speed setting and the standby speed setting.

15. The method for controlling an ignition timing of an ignition device for an internal combustion engine according to claim 10, comprising the step of allowing the microcomputer portion to receive a first cycle detection signal to thereby interrupt the bypass path of the current limiting esistor.

16. A method for controlling ignition timing of an ignition device for a capacitive discharge internal combustion engine, the ignition device including an ignition coil having an ignition plug connected to a secondary side, a generator coil in a high-voltage magneto generator driven by the internal combustion engine, a rechargeable capacitor provided on a primary side of said ignition coil and recharged by a forward voltage portion of an output voltage from said generator coil, and a dischargeable switching element for discharging electric charges of said rechargeable capacitor to a primary coil of said ignition coil by conduction provided by an ignition signal being input, said method comprising the steps of:

generating a cycle detection signal at an ignition timing calculation start point in time, at which said forward voltage portion has reached a preset cycle detection voltage as a voltage making continual ignition operations available, to detect an RPM of the internal combustion engine in accordance with a time between adjacent cycle detection signals and determine the RPM detected being less than or equal to a preset operation upper limit speed as in a normal ignition operation state in which said dischargeable switching element is conducted or interrupted for ignition operations, and determining said RPM being above the operation upper limit speed as a misfire state for stopping ignition operations with said dischargeable switching element being kept under a conduction sustain state as well as generating a preparatory cycle detection signal at a point in time at which a leading reverse voltage portion of the output voltage occurring immediately before said forward voltage portion has reached a preset preparatory cycle detection voltage, to detect an RPM in accordance with a time between adjacent preparatory cycle detection signals, such that when said detected RPM is lower than said operation upper limit speed, said dischargeable switching element is to be released from the conduction sustain state and restored to the normal ignition operation state in order to prevent over-rotation.

17. The method for controlling ignition timing of an ignition device for an internal combustion engine according to claim 16, comprising the step of:

presetting an ignition recovery speed which restores the ignition device from a misfire state to a normal ignition operation state and is below the operation upper limit speed, to set the ignition recovery speed to a value which causes no trouble under a load condition and at which said operation upper limit speed is not reached immediately after recovery.

18. The method for controlling ignition timing of an ignition device for an internal combustion engine according to claim 16, comprising the step of:

setting the preparatory cycle detection voltage to a peak value of the leading reverse voltage portion of the output voltage.

19. An ignition timing control device for an ignition device for an internal combustion engine, said ignition device having an ignition timing control device incorporated into an ignition circuit for a capacitive discharge internal combustion engine, said ignition circuit including an ignition coil having an ignition plug connected to a secondary side, a generator coil in a high-voltage magneto generator driven by the internal combustion engine, a rechargeable capacitor provided on a primary side of said ignition coil and recharged by a forward voltage portion of an output voltage from said generator coil, and a dischargeable switching element for discharging electric charges of said rechargeable capacitor to a primary coil of said ignition coil by conduction provided by an ignition signal being input, said ignition timing control device comprising a microcomputer portion for receiving a cycle detection signal generated at an ignition timing calculation start point in time at which said forward voltage portion has reached a preset cycle detection voltage as a voltage making continual ignition operations available to detect an RPM of the internal combustion engine in accordance with a time between adjacent cycle detection signals and output said ignition signal to the dischargeable switching element as required, and a constant voltage power supply portion for having a reverse voltage portion of said output voltage recharged partially restrictively with a current limiting resistor to operate said microcomputer portion by the recharged power, wherein said constant voltage power supply portion incorporates a quick-recharging portion comprising a rechargeable switching element, connected in parallel to said current limiting resistor, allowed to quickly conduct by said reverse voltage portion, and a turn-off transistor, connected between a control terminal of the rechargeable switching element and the ground, turned on by a trigger signal from said microcomputer portion to interrupt said rechargeable switching element.

20. The ignition timing control device for an ignition device for an internal combustion engine according to claim 19, comprising a rectifying diode connected in series with the rechargeable switching element.

21. The ignition timing control device for an ignition device for an internal combustion engine according to claim 19, comprising a protective resistor, having a low resistance, connected in series with the rechargeable switching element.

22. The ignition timing control device for an ignition device for an internal combustion engine according to claim 19, employing a thyristor as the rechargeable switching element.

* * * * *

UNITED STATES PATENT AND TRADEMARK OFFICE
CERTIFICATE OF CORRECTION

PATENT NO. : 6,973,911 B2  Page 1 of 1
DATED : December 13, 2005
INVENTOR(S) : Ryohei Yamashita It is certified that error appears in the above-identified patent and that said Letters Patent is hereby corrected as shown below:

<u>Title page,</u>
Item [30], Foreign Application Priority Data, change "Sep. 15, 2002" to
-- Sep. 5, 2002 --.

Signed and Sealed this

Ninth Day of May, 2006

JON W. DUDAS
*Director of the United States Patent and Trademark Office*